United States Patent
Sugiyama

(10) Patent No.: US 8,264,720 B2
(45) Date of Patent: Sep. 11, 2012

(54) PRINTING CONTROL APPARATUS AND PRINTING CONTROL METHOD THAT CAN PROMPT A USER TO SET ADDITIONAL INFORMATION WHICH IS EFFECTIVE LATER AS A PART OF A PRINT LOG

(75) Inventor: Hideki Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1033 days.

(21) Appl. No.: 12/043,890

(22) Filed: Mar. 6, 2008

(65) Prior Publication Data

US 2009/0002752 A1    Jan. 1, 2009

(30) Foreign Application Priority Data

Jun. 29, 2007    (JP) ................ 2007-172288

(51) Int. Cl.
*G06F 3/12* (2006.01)
*G06K 15/00* (2006.01)
*H04N 1/00* (2006.01)
*H04N 1/60* (2006.01)
*G03G 15/24* (2006.01)
*G03G 15/10* (2006.01)
*G03G 15/08* (2006.01)

(52) U.S. Cl. ........ 358/1.15; 358/1.1; 358/1.16; 358/1.6; 358/1.9; 399/150; 399/244; 399/263

(58) Field of Classification Search ................. 358/1.15, 358/1.1, 1.19, 1.6, 1.16, 296, 401, 426.06, 358/539; D18/36, 46, 41, 99; 399/6, 31, 399/46, 150, 244, 263, 381, 411
See application file for complete search history.

(56) References Cited

U.S. PATENT DOCUMENTS

| | | | |
|---|---|---|---|
| 6,385,655 B1 * | 5/2002 | Smith et al. | 709/232 |
| 6,469,796 B1 | 10/2002 | Leiman et al. | |
| 6,903,840 B1 * | 6/2005 | Maymin et al. | 358/1.15 |
| 7,130,070 B2 * | 10/2006 | Evans et al. | 358/1.15 |
| 7,307,744 B2 | 12/2007 | Hikawa | |
| 2002/0113993 A1 * | 8/2002 | Reddy | 358/1.15 |
| 2005/0151992 A1 | 7/2005 | Shaw et al. | |
| 2007/0081186 A1 * | 4/2007 | Numata | 358/1.15 |

FOREIGN PATENT DOCUMENTS

EP    1143695 A2    10/2001

(Continued)

*Primary Examiner* — Benny Q Tieu
*Assistant Examiner* — Ngon Nguyen
(74) *Attorney, Agent, or Firm* — Canon USA, Inc., IP Division

(57) ABSTRACT

A printing control apparatus to store print data in a storage area from a print application and to send the print data to a print apparatus. The printing control apparatus includes a control unit to send, when a billing code is set in a first received print data, the print data to the print apparatus and to control, when no billing code is set in the first received print data, an order of the print data so that subsequent data is sent before (or instead of) the first received print data, a display control unit to display a list of the print data received from the print application, and a setting unit to select one or more print data from the list of the print data displayed by the display control unit to set a billing code according to input by a user. Related methods are also disclosed.

9 Claims, 17 Drawing Sheets

FOREIGN PATENT DOCUMENTS

| | | |
|---|---|---|
| JP | 7-261868 A | 10/1995 |
| JP | 2001-318776 A | 11/2001 |
| JP | 2003-131831 A | 5/2003 |
| JP | 2004-101765 A | 4/2004 |
| JP | 2004-295670 A | 10/2004 |
| JP | 2004-303236 A | 10/2004 |
| JP | 2007-015372 A | 1/2007 |

* cited by examiner

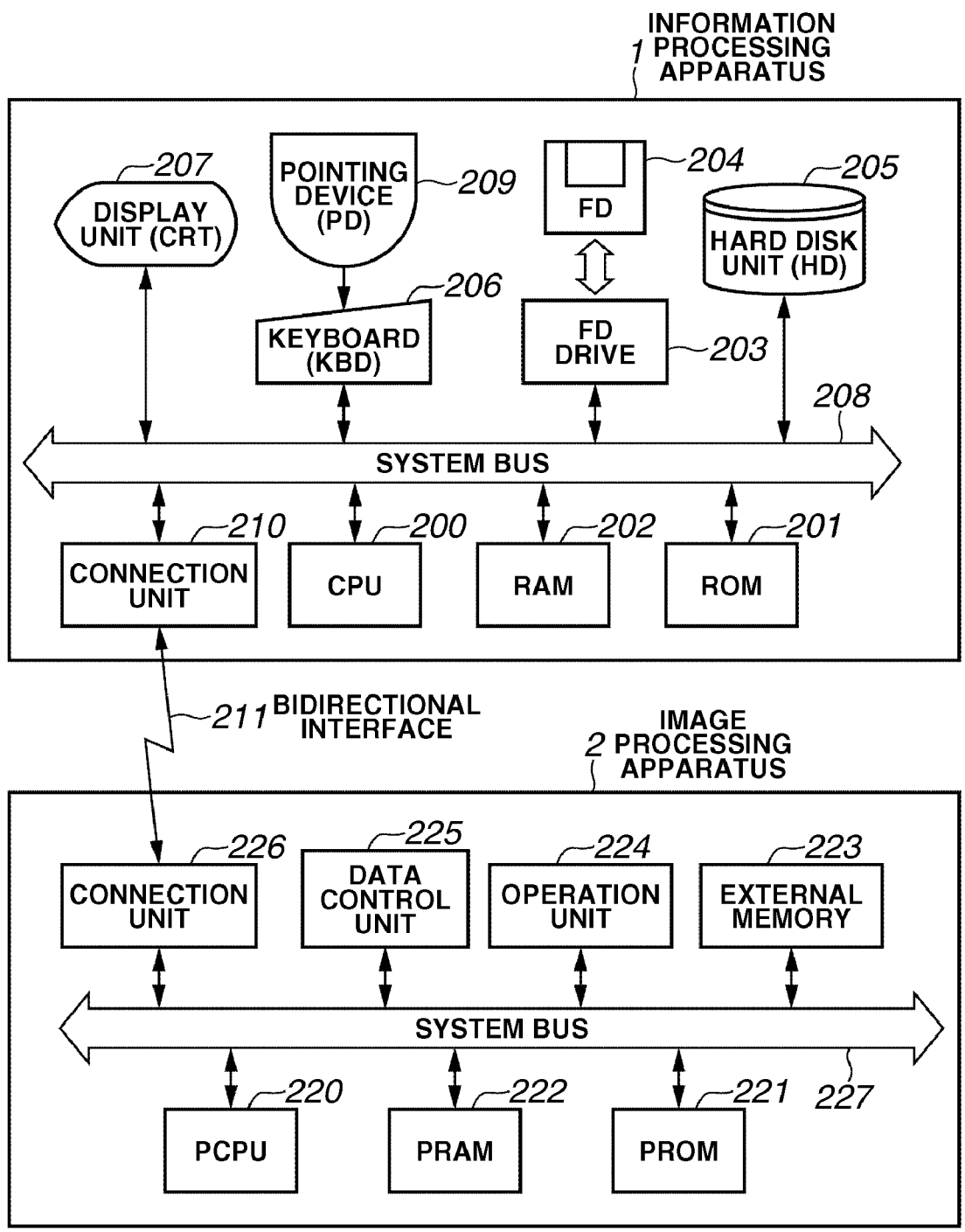

FIG.3

| INPUT BILLING CODE | | | | |
|---|---|---|---|---|
| FIRST CODE: | [_____] ~301 | | | |
| SECOND CODE: | [_____] | | 302 | |
| THIRD CODE: | [_____] | | [INPUT] | |

| 303 [PAUSE] | 304 [RESUME] | 305 [DELETE] | 306 [UPDATE] |

| Job ID | DOCUMENT NAME | OWNER | BILLING CODE | STATUS |
|---|---|---|---|---|
| 11 | Readme.txt | guest | 111,222,333 | COMPLETED |
| 12 | schedule.doc | bob | 111,222,--- | TRANSMITTING |
| 13 | information.ppt | bob | ---,---,--- | QUEUED FOR TRANSMISSION |
| 14 | info.rtf | tom | ---,---,--- | QUEUED FOR TRANSMISSION |
| 15 | info.rtf | john | 111,222,333 | QUEUED FOR TRANSMISSION |
| 16 | patent.doc | bob | ---,---,--- | SPOOLED |
| 17 | project.xls | bob | ---,---,--- | SPOOLING |
| 18 | announce.txt | jack | ---,---,--- | SPOOLING |

```
StartDate Time          "2006/12/01   12:01"
FinishDate Time         "2006/12/01   12:04"
JobName                 "Document.doc"
JobServiceJobOwner      "PRINT"
CompleteState           "Completed"
DuplexMediumCount       "0"
Nup                     "0"
TotalAmount             "150"
TotalMediumCount        "15"
TotalImpressionCount    "15"
ColorImpressionCount    "0"
BWImpressionCount       "15"
FirstBillingCodeID      "12345"
SecondBillingCodeID     "111"
ThirdBillingCodeID      " "
DeviceMacAddress        "00-16-35-7A-EE-CC"
DeviceHostName          "4F-OA LBP"
DeviceIPAddress         "150.86.11.22"
ColorType               "1"
PaperSize               "A4"
ImpressionCount         "15"
MaterialType            "1"
PaperSize               "1"
ImpressionCount         "15"
MediumCount             "15"
```

FIG. 5B

| | LOG ITEMS AND THEIR MEANINGS |
|---|---|
| StartDate Time | START TIME OF JOB |
| FinishDate Time | FINISH TIME OF JOB |
| JobName | JOB (DOCUMENT) NAME |
| JobServiceJobOwner | PRINT/COPY TYPE |
| CompleteState | COMPLETED STATE OF JOB |
| DuplexMediumCount | NUMBER OF DUPLEX-PRINTED MEDIA |
| Nup | N-up NUMBER |
| TotalAmount | TOTAL AMOUNT OF PRINT CHARGES |
| TotalMediumCount | TOTAL NUMBER OF PRINTED MEDIA |
| TotalImpressionCount | TOTAL NUMBER OF PRINTED MEDIA |
| ColorImpressionCount | NUMBER OF COLOR IMPRESSIONS |
| BWImpressionCount | NUMBER OF MONOCHROMATIC IMPRESSIONS |
| FirstBillingCodeID | FIRST BILLING CODE |
| SecondBillingCodeID | SECOND BILLING CODE |
| ThirdBillingCodeID | THIRD BILLING CODE |
| DeviceMacAddress | MAC ADDRESS OF IMAGE PROCESSING APPARATUS |
| DeviceHostName | HOST NAME OF IMAGE PROCESSING APPARATUS |
| DeviceIPAddress | IP ADDRESS OF IMAGE PROCESSING APPARATUS |
| INFORMATION FOR EACH COLOR/SIZE TYPE (*REPETITIVELY PROVIDED PER SIZE) | |
| ColorType | MONOCHROMATIC/COLOR TYPE |
| PaperSize | PAPER SIZE |
| ImpressionCount | NUMBER OF (ACTUALLY PRINTED) IMPRESSIONS UPON JOB COMPLETION CORRESPONDING TO EACH COLOR/SIZE |
| INFORMATION FOR EACH PAPER TYPE (*REPETITIVELY PROVIDED PER PAPER TYPE) | |
| MaterialType | PAPER TYPE |
| PaperSize | PAPER SIZE |
| ImpressionCount | NUMBER OF IMPRESSIONS UPON JOB COMPLETION CORRESPONDING TO EACH PAPER TYPE |
| MediumCount | NUMBER OF MEDIA UPON JOB COMPLETION CORRESPONDING TO EACH PAPER TYPE |

FIG.17A

| | |
|---|---|
| Job ID | "11" |
| Document Name | "Readme.txt" |
| Owner | "guest" |
| 1st code | "111" |
| 2nd code | "222" |
| 3rd code | "333" |
| Status | "complete" |

FIG.17B

| EXAMPLE OF EACH RECORD OF JOB INFORMATION | |
|---|---|
| Job ID | ID FOR UNIQUELY IDENTIFYING JOB |
| Document Name | DOCUMENT NAME |
| Owner | JOB OWNER |
| 1st code | FIRST BILLING CODE |
| 2nd code | SECOND BILLING CODE |
| 3rd code | THIRD BILLING CODE |
| Status | STATUS OF JOB |

PRINTING CONTROL APPARATUS AND PRINTING CONTROL METHOD THAT CAN PROMPT A USER TO SET ADDITIONAL INFORMATION WHICH IS EFFECTIVE LATER AS A PART OF A PRINT LOG

BACKGROUND OF THE INVENTION

1. Field of the Invention

The present invention relates to a technology for managing a cost of print jobs by adding additional information, such as a billing code, to a print job in a print system and collecting a log of the additional information.

2. Description of the Related Art

Recently, a print history management system has been implemented, which counts information such as printed document names, print dates and times, paper types, sizes and orientations, the number of printed documents, and a color type of printed documents (e.g., color or monochromatic documents) corresponding to each user. The print history management system associates information, e.g., customer information and a print unit cost, which is not added by print applications and printer drivers, with a print job and counts such information as a part of a print log (print history). The print history management system utilizes counted information for billing such as studying print tendency from counted results. On the other hand, in order to prevent wasted printouts from being generated, a system has been provided, which preliminarily sets the number of printouts that are available for each user so as to determine and restrict an upper limit of the number of printouts that can be generated by each user.

One method for associating additional information with a print job has been provided, which generates a print job by inputting, when generating the job, information from a print setting dialog box and writing the input information to a region (e.g., a header) other than a region in which print information is stored by a printer driver. However, it is necessary to change the driver that generates a job. Accordingly, this method cannot be applied to existing systems. Thus, a method has been provided, which displays an information input dialog when a job is sent to an image processing apparatus after the job is generated by a client personal computer (PC) and is then stored in a spooler. However, usually, jobs are sequentially sent in the order of spooling one by one at a time. Accordingly, in a case where the job to be sent is other than a first one, it takes long until the job is sent in its turn. Thus, sometimes, a user logs off a computer before an information input dialog box is displayed. Consequently, the user cannot input information. Accordingly, sometimes, because the leading job waits for input of information, processing of subsequent jobs is not performed. To prevent occurrence of this situation, in a case where no information is input for a job from the information input dialog box for a predetermined period of time, the job is canceled as timeout. Consequently, this method has a drawback in that a user having issued a print request to a printer does not receive a printed document.

Japanese Patent Application Laid-Open No. 2003-131831 discusses a technique that in a case where a leading job is queued for a resource (e.g., in a case where a printer runs out of specific paper), an image processing apparatus pauses the leading job and performs the next job in the queue.

In the conventional technique of Japanese Patent Application Laid-Open No. 2003-131831, generally, a storage unit of an image processing apparatus has smaller capacity than an information processing apparatus that doesn't implement that technique. Thus, a large number of jobs or a large job cannot be paused. Suspension of such jobs may result in a system halt. Even in an image processing apparatus having a storage unit of large capacity, it is inefficient to send a print job, which cannot be immediately performed, from an information processing apparatus via a network. Additionally, unless a user having issue a print request remains at or goes back to the image processing apparatus, the user cannot cancel specific conditions, e.g., waiting for a resource.

SUMMARY OF THE INVENTION

The present invention is directed to a printing control apparatus that can prompt a user to set additional information in a print job generated according to an instruction issued from a user. The additional information is effective later as a part of a print log.

According to an aspect of the present invention, a printing control apparatus configured to store print jobs in a storage area in the order of being received from a print application and to send the stored print jobs to a print apparatus, includes a control unit configured to control an order of sending the print jobs stored in the storage area to the print apparatus wherein, in a case where a billing code is not set in a first print job, a second print job received subsequent to the first print job is sent to the print apparatus while the first print job remains at the print control apparatus; a display unit configured to display a list of the print jobs received from the print application; and a setting unit configured to select at least one print job from the list according to input by a user and to set a billing code in the selected at least one print job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating an exemplary configuration of a print system according to an exemplary embodiment of the present invention in detail.

FIG. 3 illustrates an information input screen according to an exemplary embodiment of the present invention.

FIG. 5A illustrates exemplary logs according to an exemplary embodiment of the present invention. FIG. 5B illustrates information corresponding to each item of a log according to an exemplary embodiment of the present invention.

FIG. 17A illustrates an exemplary job list according to an exemplary embodiment of the present invention. FIG. 17B illustrates information corresponding to each item of a job list according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
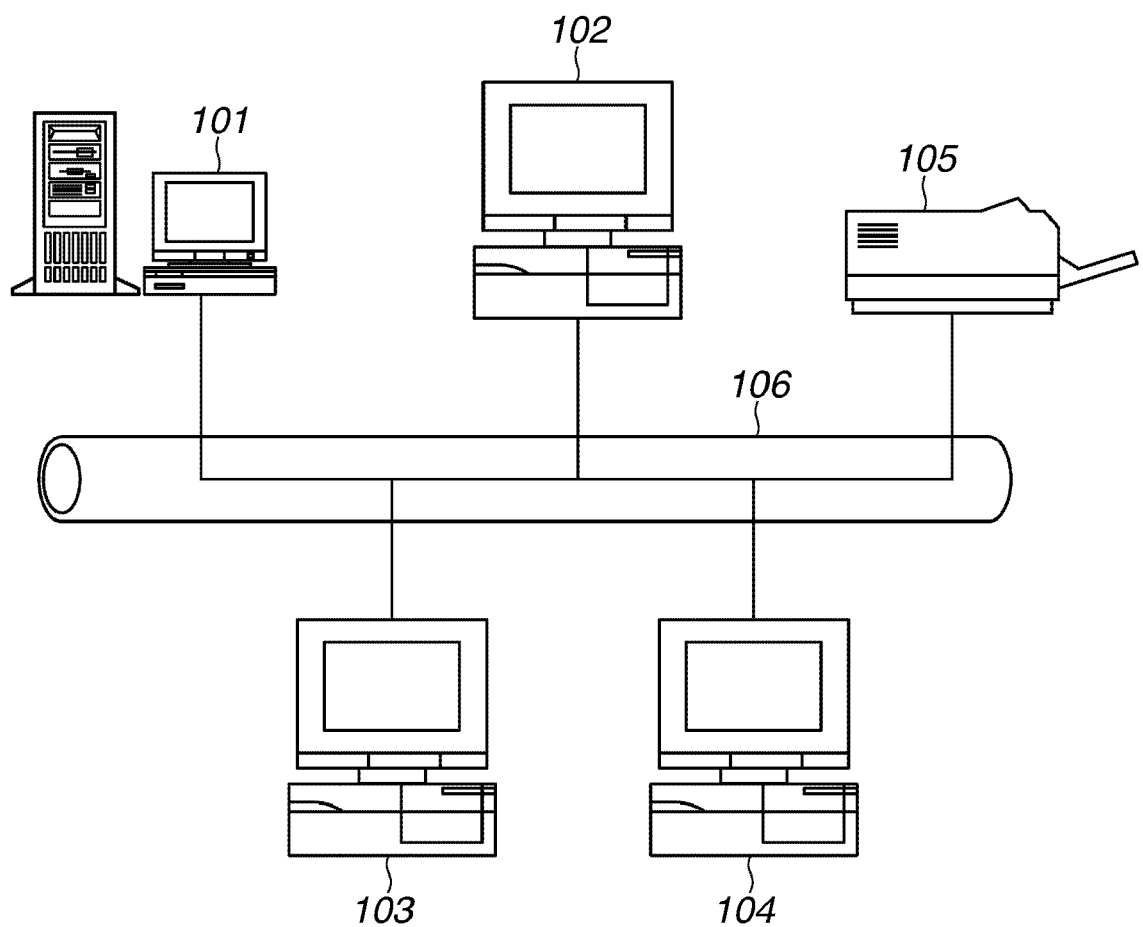
FIG. 1 is a block diagram illustrating an exemplary configuration of a print system according to an exemplary embodiment of the present invention.

FIG. 1 is a block diagram illustrating an exemplary configuration of a print system according to an exemplary embodiment of the present invention. As illustrated in FIG. 1, information processing apparatuses 101 to 104 are connected to a network 106 via network cables, such as an Ethernet®. The information processing apparatuses 101 to 104 can execute various programs, such as application programs. Printer drivers each having a function of converting print data into a printer language corresponding to a printer are loaded in the information processing apparatuses 101 to 104. The information processing apparatuses 101 to 104 have communication devices capable of bidirectionally communicating with other devices connected to the network 106.

The printer drivers support a plurality of printers. The printers (e.g., input/output (I/O) units) can be any of the various types, e.g., a laser beam printer employing an electrophotographic method, an inkjet printer employing an inkjet method, and a printer employing a thermal transfer method.

In the present exemplary embodiment, the information processing apparatuses 101 and 102, such as personal computers, are a log collection server and a print server, respectively. The log collection server 101 and the print server 102 are connected to the network 106 through network cables. These servers store files used in the network 106 and monitor a status of use of the network 106. The log collection server 101 and the print server 102 have communication devices capable of bidirectionally communicating with other devices connected to the network 106 and manage a plurality of printers.

The client computers 103 and 104, the log collection server 101, and the print server 102 are general information processing apparatuses. The log collection server 101 and the print server 102 can have functions of the client computers 103 and 104. Storage media, such as hard disks (HDs) and read-only memories (ROMs), of the client computers 103 and 104, the log collection server 101, and the print server 102 store executable control programs for implementing various controls.

The print server 102 stores print jobs including print data requested by the client computers 103 and 104 to print. The print server 102 sends the print job to an image processing apparatus. Alternatively, the print server 102 may receive receives only job information which includes no print data from the client computers 103 and 104 and may manage a printing order of the client servers 103 and 104. The print server 102 notifies one of the client computer 103 or 104 which comes its printing turn of a permission to send a print job including print data. The print server 102 has functions of acquiring various information, such as a status of a network printer 105 and print jobs, and sending notifications to the client computers 103 and 104.

The network printer 105 serves as an image processing apparatus that includes a printer, a copier, and a multifunction peripheral. The network printer 105 is connected to the network 106 via a network interface (not illustrated). Thus, the network printer 105 receives print jobs including print data sent from the print server (hereinafter sometimes referred to also as the client computer) 102 and the client computers 103 and 104.

The client computers 102, 103 and 104, the server 101, and the network printer 105 are connected to the network 106.

Referring to FIG. 2, a central processing unit (CPU) 200 is a control unit for an information processing apparatus 1 (each of the client computers 102, 103 and 104). The CPU 200 executes application programs, printer driver programs, OS programs, and network printer control programs according to the present exemplary embodiment of the present invention which are stored in a hard disk (HD) 205. Further, the CPU 200 controls temporary storage of information and files necessary to execute programs in a random access memory (RAM) 202.

A ROM 201 is a storage unit that stores programs such as basic I/O programs, and various data such as font data used for document processing, and template data. A RAM 202 is a temporary storage unit serving as a main memory and a work area for the CPU 200.

A Floppy® disk (FD) drive 203 is a storage medium reading unit. As illustrated in FIGS. 5A and 5B, which will be described later, programs stored in a FD 204 serving as a storage medium can be loaded in a computer system serving as a client computer via the FD drive 203. The storage medium is not limited to a FD. A compact disk read-only memory (CD-ROM), a compact disk recordable (CD-R), a compact disk rewritable (CD-RW), a PC memory card, a digital versatile disk (DVD), an integrated circuit (IC) memory card, a magneto-optical disk (MO), and a memory stick can be used as the storage medium.

The FD 204 stores programs that can be read by a computer.

The HD 205 is an external storage unit functioning as a mass memory. The HD 205 stores application programs, printer driver programs, OS programs, control programs, and relating programs. Additionally, the HD 205 assures an area for storing a spooler. In the client computer, the spooler is a client spooler. In the print server, the spooler is a server spooler. The print server stores job information received from the client computers. A table for controlling a printing order is generated and stored in the external storage unit.

A keyboard (KBD) 206 serves as an instruction input unit for inputting instructions such as device control commands. A pointing device (PD) 209 is connected to the keyboard 206.

A display (display unit) 207 displays representations of processed instructions and/or data, such as for example, commands input from the keyboard 206 or statuses of the printers.

A system bus 208 controls data flows among components of the client computer.

A connection unit 210 sends and receives data to and from external devices via a bidirectional interface 211.

An exemplary operation to load control programs and related data directly into the RAM 202 from the FD 204 and to execute the programs according to the present exemplary embodiment is described below. Alternatively, the control program which is already installed in the HD 205 can be loaded into the RAM 202 every time the control program is executed from the FD 204.

In addition to FDs, CD-ROMs, CD-Rs, PC cards, DVDs, and IC memory cards can be used as media for storing the control programs. Additionally, the control programs can be stored in the ROM 201 and configured to constitute a part of a memory map to be directly executed by the CPU 200.

Next, a configuration of the image processing apparatus 2 is described below in detail. Main components of the image processing apparatus 2 are a connection unit 226, a data control unit (printer engine) 225, an operation unit 224, an external memory 223, a printer CPU (PCPU) 220, a printer RAM (PRAM) 222, and a printer ROM (PROM) 221. These components of the image processing apparatus 2 are connected to one another via a system bus 227.

The PCPU 220 controls the entire image processing apparatus 2. The PCPU 220 sends an image signal to the data control unit 225 according to a printer control command (transmission data) received by the connection unit 226 based on the control program stored in the PROM 221 or the external memory 223.

The PRAM 222 serves as a main memory for the PCPU 220 and has a temporary storage area for various data which is used as a work data area when a control operation is performed by the PCPU 220. The external memory 223 is optionally connected to the system bus 227 and stores font data, emulation programs, and form data. The PROM 221 is a printer internal memory that stores various data and control programs for controlling the image processing apparatus, similar to the external memory 223.

The data control unit 225 is a printer engine and is controlled by the PCPU 220. The data control unit 225 receives an image signal output by the control program stored in the PROM 221 or the external memory 223 via the system bus 227, and performs actual print processing. The operation unit 224 includes an input section, which has an operation panel and an operation switch, and a display section having a light-emitting-diode (LED) panel or a liquid crystal panel. The operation unit 224 accepts an operation by an operator and displays a result thereof. The operator can instruct a setting of the image processing apparatus 2 and check the setting thereof via the operation unit 224.

The connection unit 226 is connected to the connection unit 210 of the information processing apparatus 1 via the above-described bidirectional interface 211. Thus, the connection unit 226 can notify a state in the image processing apparatus 2 which receives a print control command (transmission data) to the information processing apparatus 1.

Additionally, a software capable of implementing equivalent functions of the above-mentioned devices can be constituted as an alternative hardware device.

The present invention can be applied to both of a case where the client computer for generating print jobs, the printer server for sending print jobs, and the log collection server for collecting and managing print jobs are information processing apparatuses having the same configuration as one another, and a case where the client computer for generating print jobs, the printer server for sending print jobs, and the log collection server for collecting and managing print jobs are information processing apparatuses having different configurations than one another.

FIG. 3 illustrates an exemplary information input UI (screen) according to the present exemplary embodiment of the present invention. This dialog box is displayed in the display unit 207 of the client computer by a spooler monitoring module 407 illustrated in FIG. 4, which will be described later. The dialog box receives input by a user from an instruction device, such as the keyboard 206. The information input UI has a billing code input field 301, an input determination button 302, job operation buttons (in this embodiment, a pause button 303, a resume button 304, and a delete button 305), a display update button 306, and a job list display section 307. The job list display section 307 can display a list which shows a job identification (ID), a document name, a job owner, a billing code, and a status on each line as a job list. A plurality of jobs can be selected according to an instruction from a user. The selected jobs are distinguishably reversely displayed. When jobs are selected, the billing code input field 301 becomes effective to be able to input optional character strings. When selecting a plurality of jobs, a plurality of billing codes can simultaneously be input.

Figure 4:
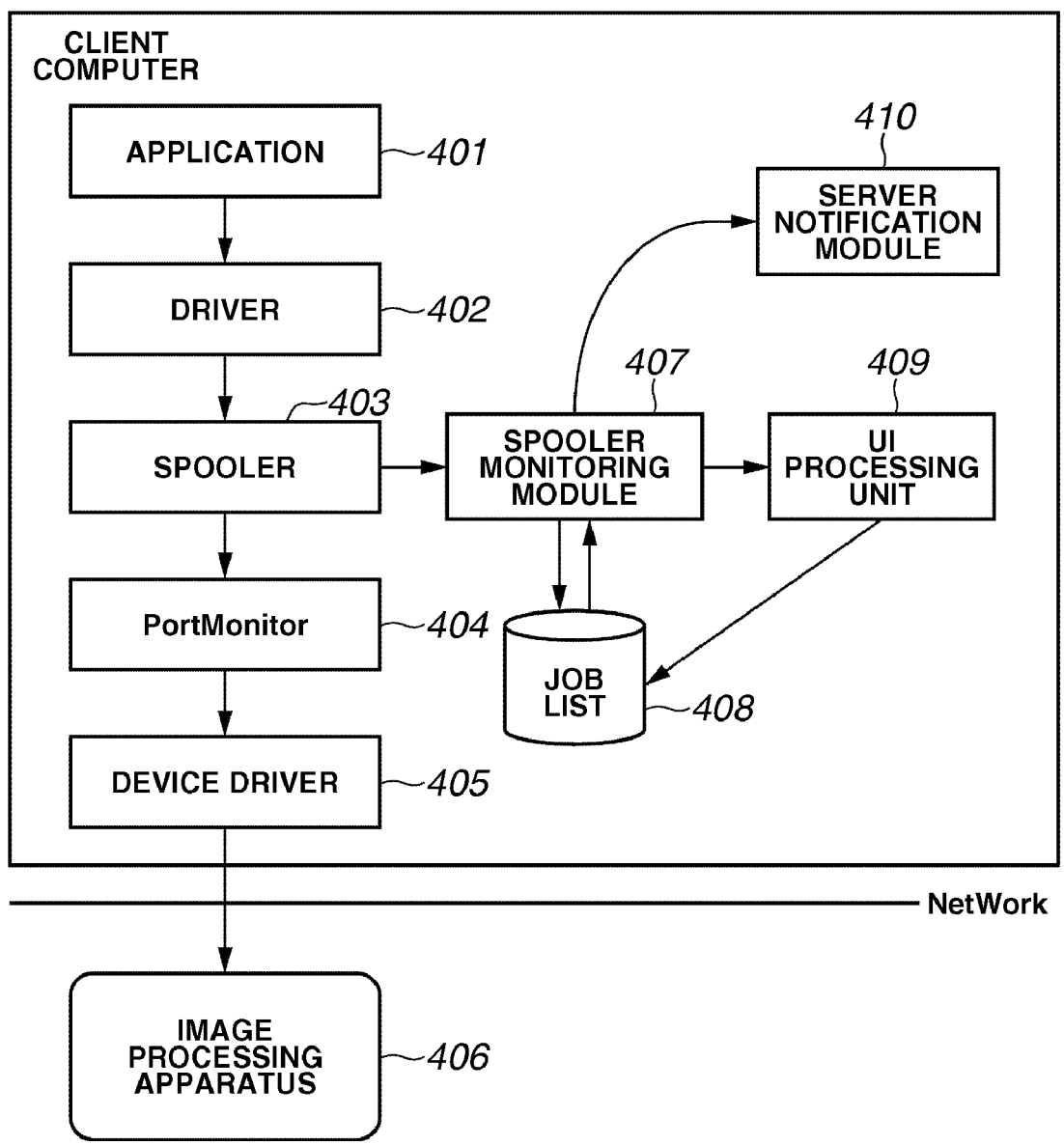
FIG. 4 is a block diagram illustrating an exemplary relation among modules and devices operating in a client computer according to an exemplary embodiment of the present invention.

FIG. 4 illustrates an example of modules operating on a client computer constituting a print system, a relation between the modules and an image processing apparatus, and a flow of a job according to the present exemplary embodiment. The client computer, e.g., a widely-used personal computer (corresponding to the information processing apparatus) uses a Windows® operating system, such as Windows XP or Windows Vista, (herein Windows®) produced by Microsoft Corporation as an operating system (OS). Further, the client computer activates an application program (print application program) 401, such as Word® produced by Microsoft Corporation, which has a print processing function.

The client computer serving as a print control apparatus (print control unit) according to the present exemplary embodiment has at least a driver, a spooler monitoring module, a UI control unit, and a port monitor. The print control apparatus can have a storage medium for storing various information used in processing performed therein, and all modules illustrated in FIG. 4 other than a print application. In addition, as will be described later, the print control apparatus can be implemented in an image processing apparatus (e.g., a print apparatus (printer) and a copier).

A user generates a document using the instruction devices, such as the keyboard 206 and the pointing device 209. Then, the user instructs to print the document using a print instruction unit provided for the application program. The application program 401 passes print data to a printer driver 402 and generates a print job. The printer driver 402 passes the generated print job to a spooler 403. The spooler 403 spools the print jobs passed from a plurality of drivers and schedules the jobs corresponding to each of the printers specified by the user. Then, the spooler 403 passes the job to a port monitor 404 corresponding to a port connected to the printer. The port monitor 404 accordingly calls a device driver 405 corresponding to the port (e.g., a universal serial bus (USB) or a network port) and passes the job to the device driver 405. The device driver 405 transfers the passed data to an image processing apparatus 406 via the connection unit 210 according to a predetermined method.

The image processing apparatus 406 sequentially executes the print jobs passed from the client computer.

The spooler monitoring module 407 automatically starts operating when the client computer is booted. The spooler monitoring module 407 monitors the spooler 403 using a spooler function preliminarily provided in the OS. More particularly, the spooler monitoring module 407 monitors the addition, deletion, and alteration of the printer driver, and the job generation and status corresponding to each printer driver. When a job is spooled, the job is stored in a preliminarily prepared storage area for a job list 408 together with annex information representing a status, a size, a printer driver name, an owner, a document name, a date and a time. Simultaneously, a UI processing unit (display control unit) 409 displays an information input dialog box (information input UI), which is illustrated in FIG. 3, in a display unit 207 of the client computer. When receiving input information from the user via the information input UI, the UI processing unit 409 reflects the input information in the job list 408. Additionally, the spooler monitoring module 407 passes a log to a server notification module 410. Thus, the log collection server 101 is notified of the log.

FIG. 5A illustrates an exemplary log according to the present exemplary embodiment. The log is generated in the storage unit, such as the RAM 202 or the HD 205, by the spooler monitoring module 407 that operates on the client computer. The server notification module 410 notifies the log to the log collection server 101. FIG. 5B illustrates an explanation of each item of the log. A logical value, a numerical value, or a character string is entered in each item of the log.

FIG. 17A illustrates an exemplary job list according to the present exemplary embodiment. The job list is a record representing job information which can be confirmed from the job list 408 illustrated in FIG. 4 and from a job list 1408 illustrated in FIG. 14, which will be described later. FIG. 17B illustrates an explanation of each item of the job list illustrated in FIG. 17A. The spool monitoring module operating on the client computer stores job lists in storage areas secured as many as the number of records in the storage unit, such as the RAM 202 or the HD 205.

Job information obtained by adding a billing code to information relating to each job as additional information is treated as a log. A billing destination corresponding to the billing code can preliminarily be determined. A method of utilizing a billing code, for example, can be set as follows. The billing destination is not preliminarily determined. Each client (user) can use the billing code for expense control when a job is uniquely processed. A billing code can be set after an associated job is generated, as will hereinafter be described in the present exemplary embodiment. Each billing code is constituted by an arbitrary character string code other than a single character "0". Each billing code includes three independent subcodes. A user can designate all of the three billing codes. Alternatively, a user can designate only two or one of the three billing codes. The log collection server 101 utilizes each billing code included in a log for determining destinations which the bill is distributed to and a billing amount.

According to the present exemplary embodiment, one client computer generates print jobs and sends the print jobs to the image processing apparatus.

Figure 6:
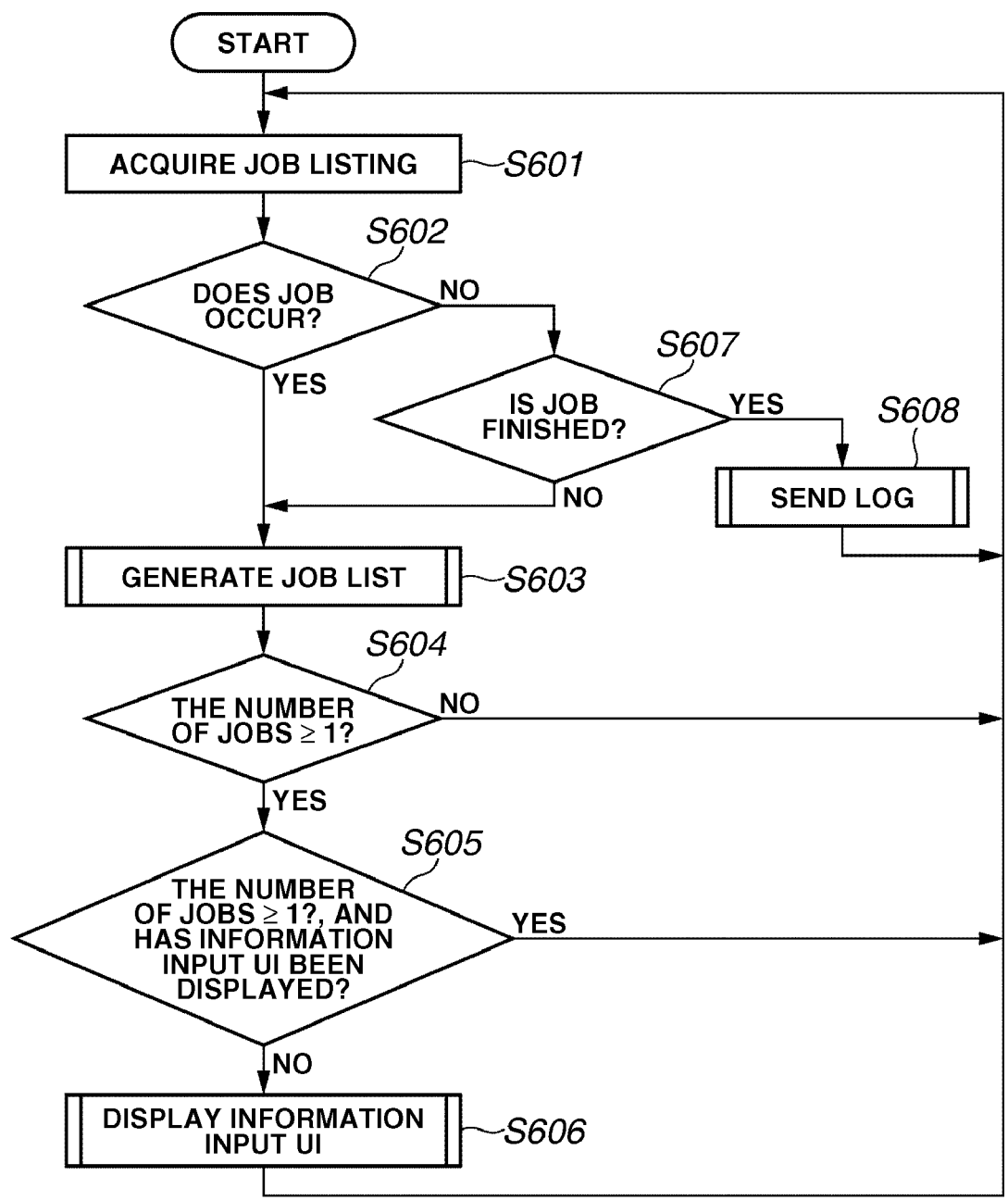
FIG. 6 illustrates an exemplary flow of a basic operation in a process performed in a spooler monitoring module according to an exemplary embodiment of the present invention.

FIG. 6 illustrates an exemplary flow of a basic operation of the spooler monitoring module 407 according to the present exemplary embodiment.

In step 601, the spooler monitoring module 407 acquires a job listing. For example, the spooler monitoring module 407 calls a Win32 function EnumJob( ) provided in Windows®. Then, the spooler monitoring module 407 acquires a print job listing spooled in a spooling area of the client computer. The spooler monitoring module 407 stores the print job listing to a work area preliminarily secured in the storage unit, such as the RAM 202 or the HD 205.

Next, in step 602, the spooler monitoring module 407 determines whether a new job occurs in the job listing acquired in step 601. More particularly, the CPU 200 compares a job list 408, which will be described later, with the job listing acquired in step 601. If a new job ID is added to the job listing, the CPU 200 determines that a new job occurs.

If it is determined that a new job occurs in step 602, the spooler monitoring module 407 adds to the job list 408 the job newly acquired in step 601 and attribute information relating to the job in step 603. The job list 408 has one job ID and attribute-information relating to the job, such as a document name, corresponding to each job. The job list 408 also has additional information, such as a billing code, which is added by the print system to the job list 408, corresponding to each job. The job list 408 is stored in a storage medium, such as the RAM 202 or the HDD 205, when the spooler monitoring module 407 is activated. The attribute information relating to each job is acquired by a Win32 function GetJob( ) provided in Windows® or a method unique to the print system.

Next, in step 604, the spooler monitoring module 407 determines whether the job list 408 generated in step 603 has one or more jobs. More particularly, the CPU 200 studies the job list 408 stored in the storage medium, such as the RAM 202 or the HD 205, and calculates the number of records of the jobs. If it is determined that the job list 408 has no job, the CPU 200 returns to step 601.

If it is determined in step 604 that the job list 408 has one or more jobs, the spooler monitoring module 407 determines in step 605 whether the UI processing unit 409 has displayed an information input UI. For example, the spooler monitoring module 407 calls a Win32 function FindWindow( ), which is provided in Windows®. If a window based on processing performed by the UI processing unit 409 has been displayed, the spooler monitoring module 407 determines that the UI processing unit 409 has displayed an information input UI. If the information input UI has been displayed, the CPU 200 repeats a process consisting of steps 601 to 605.

If it is determined in step 605 that no information input UI is displayed, the spooler monitoring module 407 displays the information input UI in the display unit 207, such as a cathode ray tube (CRT), by using the UI processing unit 409 in a predetermined procedure in step 606.

If it is determined in step 602 that no new job occurs, the spooler monitoring module 407 determines in step 607 whether a job has been finished. More particularly, the CPU 200 compares the job listing acquired in step 601 with the job list 408 stored in the storage medium, such as the RAM 202 or the HD 205. If there is no job in the job listing, the CPU 200 determines that the jobs stored in the job list 408 have been finished.

If it is determined in step 607 that the job has been finished, the spooler monitoring module 407 notifies the log collection server 101 of a log in step 608. More particularly, the CPU 200 extracts a record of the finished job from the job list 408 stored in the storage medium, such as the RAM 202 or the HD 205. Then, the CPU 200 generates a log, as illustrated in FIGS. 5A and 5B, and passes the log to the server notification module 401. The CPU 200 deletes an associated record from the job list 408. Then, the CPU 200 stores the changed job list 408 in the storage medium, such as the RAM 202 or the HD 205. The server notification module 410 notifies the log collection server 101 of the log via the network.

Figure 7:
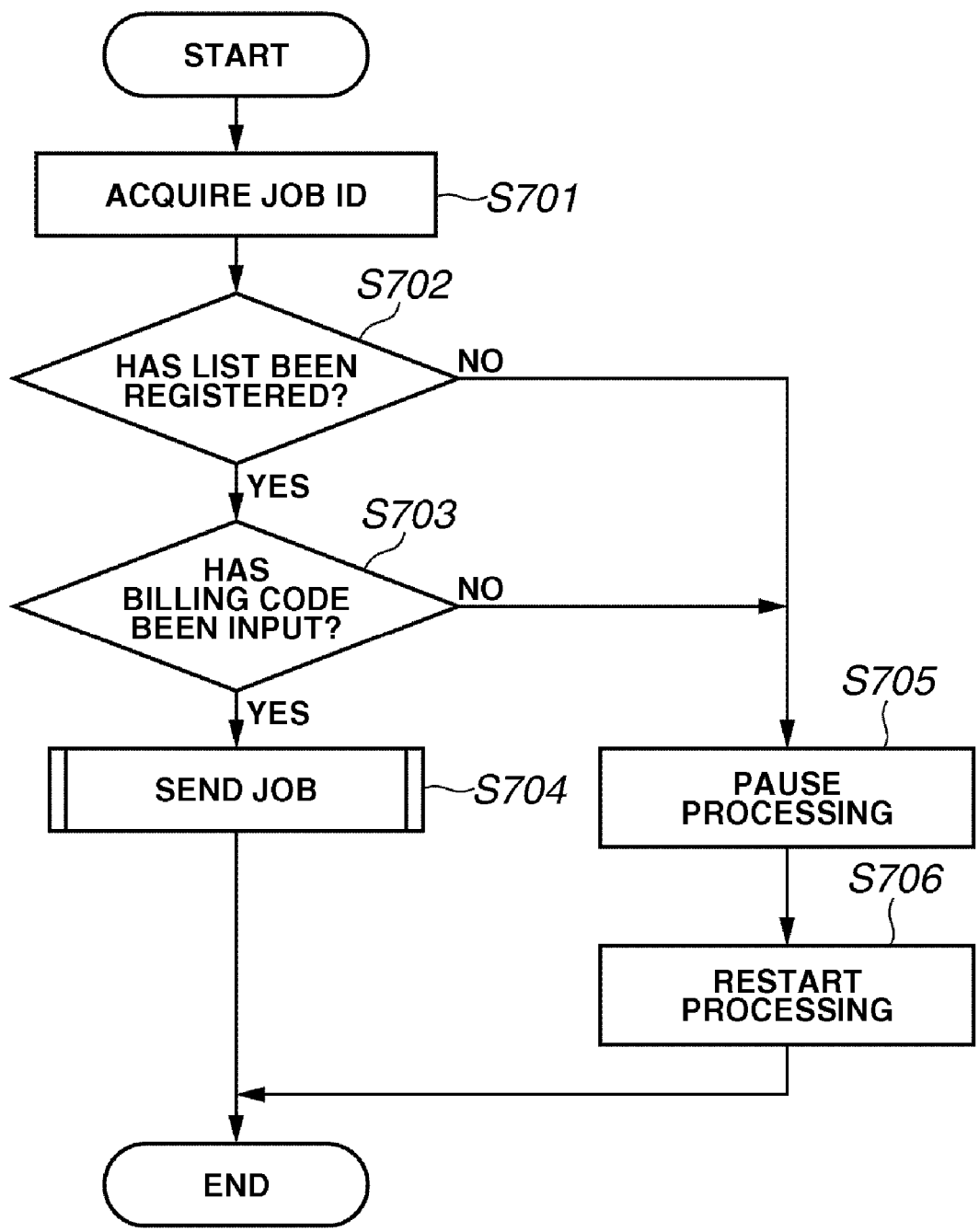
FIG. 7 illustrates an exemplary flow of a basic operation in a process performed in a port monitor according to an exemplary embodiment of the present invention.

FIG. 7 illustrates an exemplary flow of a basic operation of the port monitor 404 according to the present exemplary embodiment. The port monitor 404 is called every job by a spooler process. A job ID and a print destination are designated. If necessary, divided job data is passed to the port monitor 404. Then, the port monitor 404 sequentially sends the divided job data to the image processing apparatus 406.

In step 701, the port monitor 404 acquires a job ID passed from the spooler 403.

Next, in step 702, the CPU 200 searches the job list 408 generated by the above-described spooler monitoring module 407 and stored in the storage medium, such as the RAM 202 or the HD 205, for the job ID acquired in step 701.

If a job corresponding to the job ID is found in the job list 408, the CPU 200 searches annex information of the found job in step 703 and determines whether an effective billing code is set therein. More particularly, if a numerical value other than "0" is set in at least one of the fields of the three billing codes, the CPU 200 determines that the effective billing code is set.

If the CPU 200 determines in step 703 that the effective billing code has been input thereto, the port monitor 404 sends the job to the image processing apparatus 406 via the network in step 704.

If the CPU 200 determines in step 702 that the job corresponding to the job ID has not been registered in the list, or if the CPU 200 determines in step 703 that no effective billing code is input thereto, the port monitor 404 pauses the job in step 705. More particularly, the port monitor 404 designates the job using a Win32 function SetJob( ) provided in Windows® produced by Microsoft Corporation. The port monitor 404 designates a parameter of the function as "JOB_CONTROL_PAUSE" in order to pause processing of the job. Thus, the job is paused in step 705, so that printing corresponding to the job is stopped until it comes to the turn of the job in the queue in the spooler to perform this printing.

Next, in step 706, the port monitor 404 restarts the job. For example, the port monitor 404 designates the job using the Win32 function SetJob( ) provided by Windows® produced by Microsoft Corporation. The port monitor 404 designates a parameter of the function as "JOB_CONTROL_RESTART" in order to restart processing of the job. Thus, the job is performed from the beginning thereof the next time. If a leading job in the queue is paused when the spooler dequeues the leading job from the queue, the spooler skips the leading job and starts processing the next job.

Figure 8:
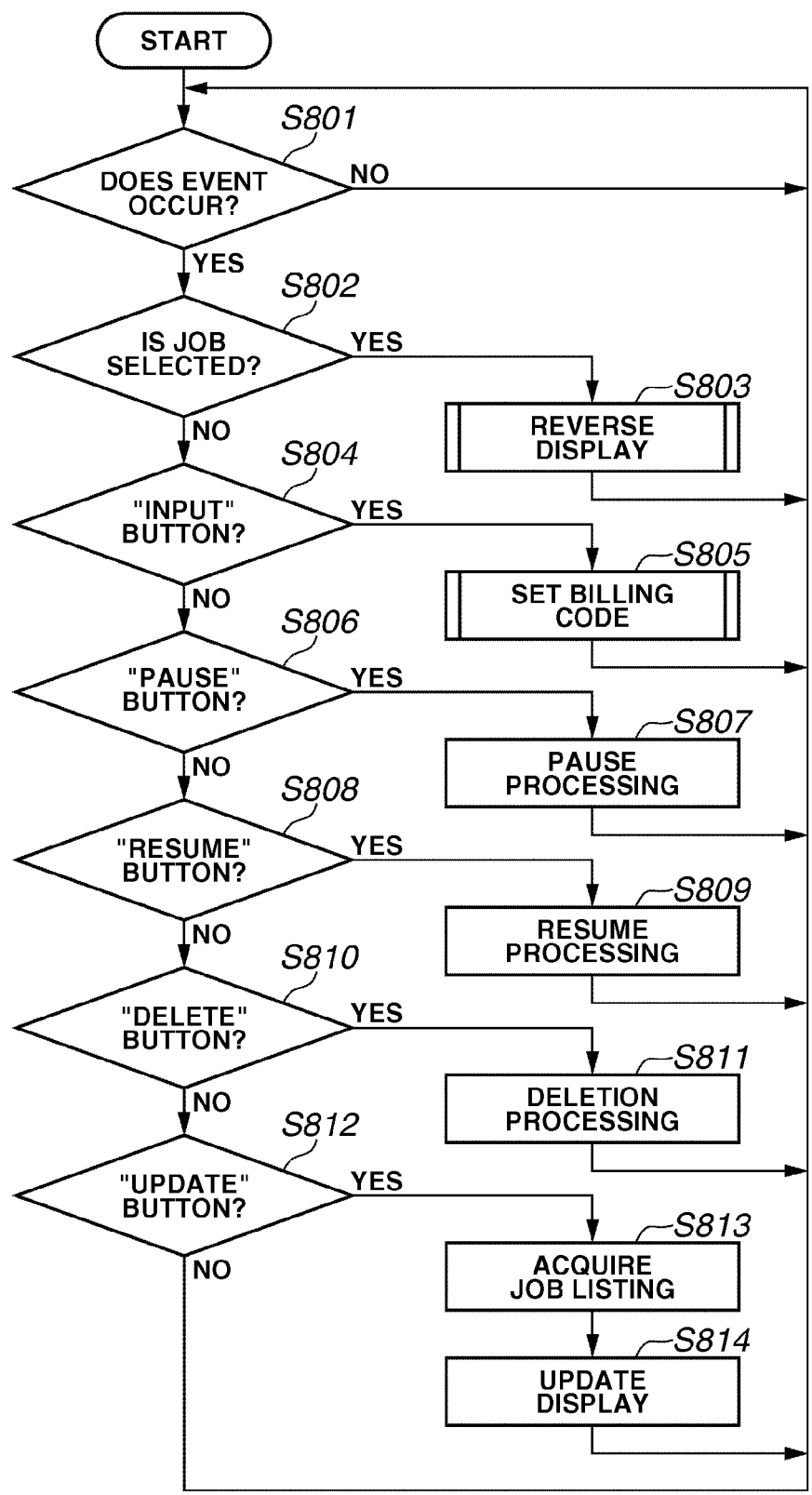
FIG. 8 illustrates an exemplary flow of a basic operation in a process performed by a user interface (UI) processing unit according to an exemplary embodiment of the present invention.

FIG. 8 illustrates an exemplary flow of a basic operation of the UI control unit 409 according to the present exemplary embodiment.

The UI control unit 409 is activated by the spooler monitoring module 407. Alternatively, a user can activate the UI control unit 409 at an optional timing and can cause the UI control unit 409 to display an information input UI. In an initial display state, the job list display section 307 illustrated in FIG. 3 displays all the records stored in the job list 408 together with the annex information. If the entire job list 408 cannot be fit within the display area of the job list display section 307, a scrollbar will be displayed in the job list display section 307. All of the jobs listed in the job list 408 are in an unselected state, and the billing code input field 301 is empty.

In step 801, the UI control unit 409 determines whether an event, such as a click of a button, occurs.

For example, according to a method described in Microsoft Developer Network (MSDN) Library® provided by Microsoft Corporation, an operation, such as a click with a mouse button or a keyboard input, and an identification (ID) for uniquely determining each resource such as a button and a list box within a window, can be determined as events. Processing in step 801 is repeated until an event occurs.

If it is determined in step 801 that an event occurs, the UI control unit 409 determines in step 802 whether the event is a job selection. More particularly, if an event acquired in step 801 includes a selection operation using a mouse button, which corresponds to the job ID represented by the record in the job list display section 307 illustrated in FIG. 3, the UI control unit 409 determines that the event is a job selection.

If it is determined in step 802 that the event is a job selection, the UI control unit 409 reverses a color of display before or after the job selection in step 803 so as to enable a user to recognize that the record is selected on the display section 307.

If it is determined in step 802 that the event is not a job selection, the UI control unit 409 determines whether an "input" button is clicked in step 804. More particularly, if the event acquired in step 801 includes a selection operation using a mouse button corresponding to an ID representing the "input" button 302 illustrated in FIG. 3, the UI control unit 409 determines that the "input" button 302 is clicked.

If it is determined in step 804 that the "input" button 302 is clicked, the UI control unit 409 sets a billing code in the job list 408 in step 805. The CPU 200 searches the job list 408 illustrated in FIG. 3 for a record reversely displayed on the job list display section 307. Then, the CPU 200 acquires a job ID from the found record. Further, the CPU 200 sets values of the first billing code, the second billing code, and the third billing code illustrated in FIG. 3 in a billing code field of a record corresponding to the job ID in the job list 408 stored in the storage medium, such as the RAM 202 or the HD 205.

If it is determined in step 804 that the "input" button 302 is not clicked, the UI control unit 409 determines in step 806 that the "pause" button 303 is clicked. More particularly, if the event acquired in step 801 includes an ID representing the "pause" button 303 illustrated in FIG. 3 and a selection operation using a mouse button, the UI control unit 409 determines that the "pause" button 303 is clicked.

If the UI control unit 409 determines in step 806 that the "pause" button 303 is clicked, the CPU 200 searches the job list 408 illustrated in FIG. 3 in step 807 for a record reversely displayed on the display section 307. Then, the CPU 200 acquires a job ID from the found record. Next, the CPU 200 designates a job corresponding to the acquired job ID using, e.g., the Win32 function SetJob( ) provided in Windows®. Further, the CPU 200 designates a parameter of the function as "JOB_CONTROL_PAUSE" in order to pause processing of the job.

If the UI control unit 409 does not determine in step 806 that the "pause" button 303 is clicked, the UI control unit 409 determines in step 808 that the "resume" button 304 is clicked. More particularly, if the event acquired in step 801 includes an ID representing the "resume" button 304 illustrated in FIG. 3 and a selection operation using a mouse button, the UI control unit 409 determines in step 808 that the "resume" button 304 is clicked.

If the UI control unit 409 determines in step 808 that the "resume" button 304 is clicked, the CPU 200 searches the job list 408 illustrated in FIG. 3 for a reversely displayed record on the job list display section 307 in step 809. Then, the CPU 200 acquires a job ID from the found record. Next, the CPU 200 designates a job corresponding to the acquired job ID, using, e.g., the Win32 function SetJob( ) provided in Windows®. Further, the CPU 200 designates a parameter of the function as "JOB_CONTROL_RESUME" in order to resume processing of the job. Consequently, if the job is pausing, the pausing is canceled. If a part of job data has been sent, the rest of the job is sent. If the job is not pausing, the status of the job is unchanged.

If it is not determined in step 808 that the "resume" button 304 is clicked, the UI control unit 409 determines in step 810 whether the "delete" button 305 is clicked. More particularly, if the event acquired in step 801 includes an ID representing the "delete" button 305 illustrated in FIG. 3 and a selection operation using a mouse button, the UI control unit 409 determines that the "delete" button 305 is clicked.

If the UI control unit 409 determines in step 810 that the "delete" button 305 is clicked, the CPU 200 searches the job list 408 illustrated in FIG. 3 for a reversely displayed record on the job list display section 307 in step 811. Then, the CPU 200 acquires a job ID from the found record. Next, the CPU 200 designates a job corresponding to the acquired job ID, using, e.g., the Win32 function SetJob( ) provided in Windows®. Further, the CPU 200 designates a parameter of the function as "JOB_CONTROL_DELETE" in order to delete processing of the job.

If it is determined in step 810 that the "delete" button 304 is not clicked, the UI control unit 409 determines in step 812 whether the "update" button 306 is clicked. More particularly, if the event acquired in step 801 includes an ID representing the "update" button 305 illustrated in FIG. 3 and a selection operation using a mouse button, the UI control unit 409 determines that the "update" button 306 is clicked.

If it is determined in step 812 that the "update" button 306 is clicked, the UI control unit 409 reacquires a job listing in step 813. For example, the UI control unit 409 calls a Win32 function EnumJob( ) or GetJob( ), which is provided in Windows®, or a method unique to the print system. Thus, the UI control unit 409 acquires a listing of print jobs and annex information. Then, the UI control unit 409 updates information of the job list 408 preliminarily secured in the storage unit, such as the RAM 202 or the HD 205, according to the acquired job information.

Next, in step 814, the UI control unit 409 updates the display in the job list display section 307 illustrated in FIG. 3 according to information on the job list 408 updated in step 813.

According to the above-described method, operations and inputting of additional information can be performed on a plurality of jobs at a time using the job list in the first exemplary embodiment. Consequently, convenience can be enhanced. Moreover, job processing is not stopped at the spooler because of waiting for inputting additional information. Furthermore, even when the additional information is not input in a job, the subsequent jobs can be continuingly performed without deleting the job.

Second Exemplary Embodiment

According to a second exemplary embodiment of the present invention, an improvement of a printing control apparatus and method is provided, which is configured to preferentially perform a print job whose job information is input from an information input UI. For example, in a spooling system according to Windows®, priorities are set in queued print jobs. Each queued print job can be designated and can acquire and set a priority thereof using Win32 functions GetJob( ) and SetJob( ) provided in Windows®. The priority of each queued print job can be set in a range from a lowest level of 1 to a highest level of 99. Generally, the priority of each print job is determined and set at the lowest level of 1 when print jobs are spooled.

Figure 9:
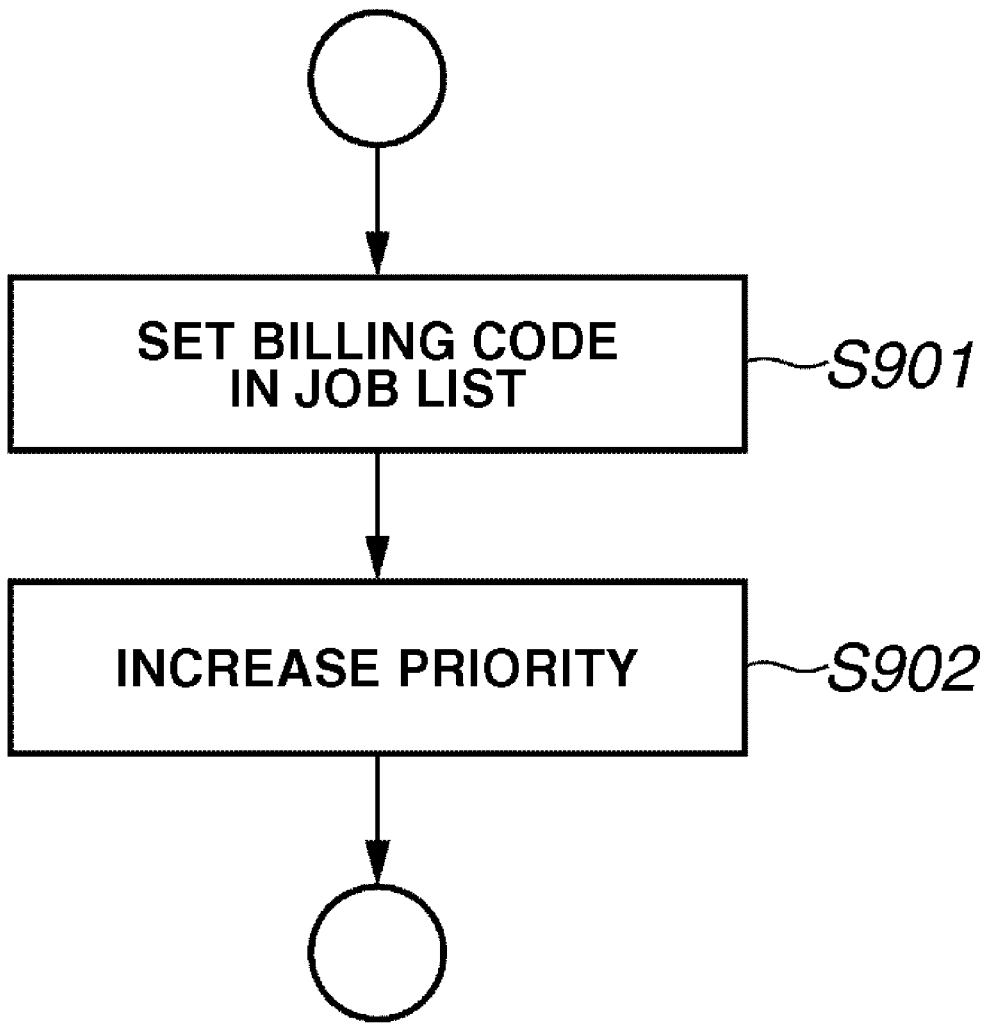
FIG. 9 illustrates an exemplary flow of a process performed in a UI processing unit according to a second exemplary embodiment of the present invention.

In the following description, only differences of the second exemplary embodiment from the first exemplary embodiment are described. An improvement of the basic operational flow of the UI processing unit illustrated in FIG. 8, more specifically, that of the "billing code setting" processing in step 805 is described below with reference to FIG. 9. In the following description, an initial value of the priority of each of all print jobs is assumed to be set at 1.

In step 901, the UI control unit 409 sets a billing code in each of print jobs listed in the job list 408. According to a preliminarily provided method, the CPU 200 searches the job list display section 307 illustrated in FIG. 3 for a record reversely displayed therein. Further, the CPU 200 acquires a job ID from the found record. Next, the CPU 200 sets a value of each of the first to third billing codes illustrated in FIG. 3 to an associated one of the billing code fields of the found record in the job list 408 stored in the storage medium, such as the RAM 202 and the HD 205, respectively.

Next, in step 902, the UI control unit 409 increases the priority of each job whose billing code is set in step 901. For example, the UI control unit 409 acquires a priority of each of such print jobs using the Win32 function GetJob( ) provided in Windows® produced by Microsoft Corporation. Then, the UI control unit 409 sets a new priority of each of such print jobs using the Win32 function SetJob( ) to a value in which one (1) is added to the acquired priority.

Consequently, the priority of each print job whose billing code is set among the queued print jobs in the spooler is increased by one (1). Thus, the job with the higher priority in the queue, namely the job whose billing code is set, is preferentially processed. Even in a case where a job whose billing code is not set is a preceding print job in the queue, a subsequent print job whose billing code is set in the queue is earlier processed.

According to the second exemplary embodiment, a priority is set in each print job so that a job, to which additional information is added, is preferentially performed. More specifically, a print job whose billing code is set is processed earlier than a print job whose billing code is not set, regardless of an order of spooling in the queue in the spooler. Consequently, print processing of a print job can avoid stagnation in processing caused by waiting for inputting additional information corresponding to the print job.

Third Exemplary Embodiment

In a case where a user mistakenly gives a print instruction to a print job and leaves the print job unperformed without inputting additional information such as a billing code, the print job may remain in a queue without being processed in the spooler 403. Thus, according to a third exemplary embodiment of the present invention, an improvement of the printing control method is provided such that a print job, the additional information of which is not input for a certain time, is automatically deleted from the queue in the spooler 403.

Figure 10:
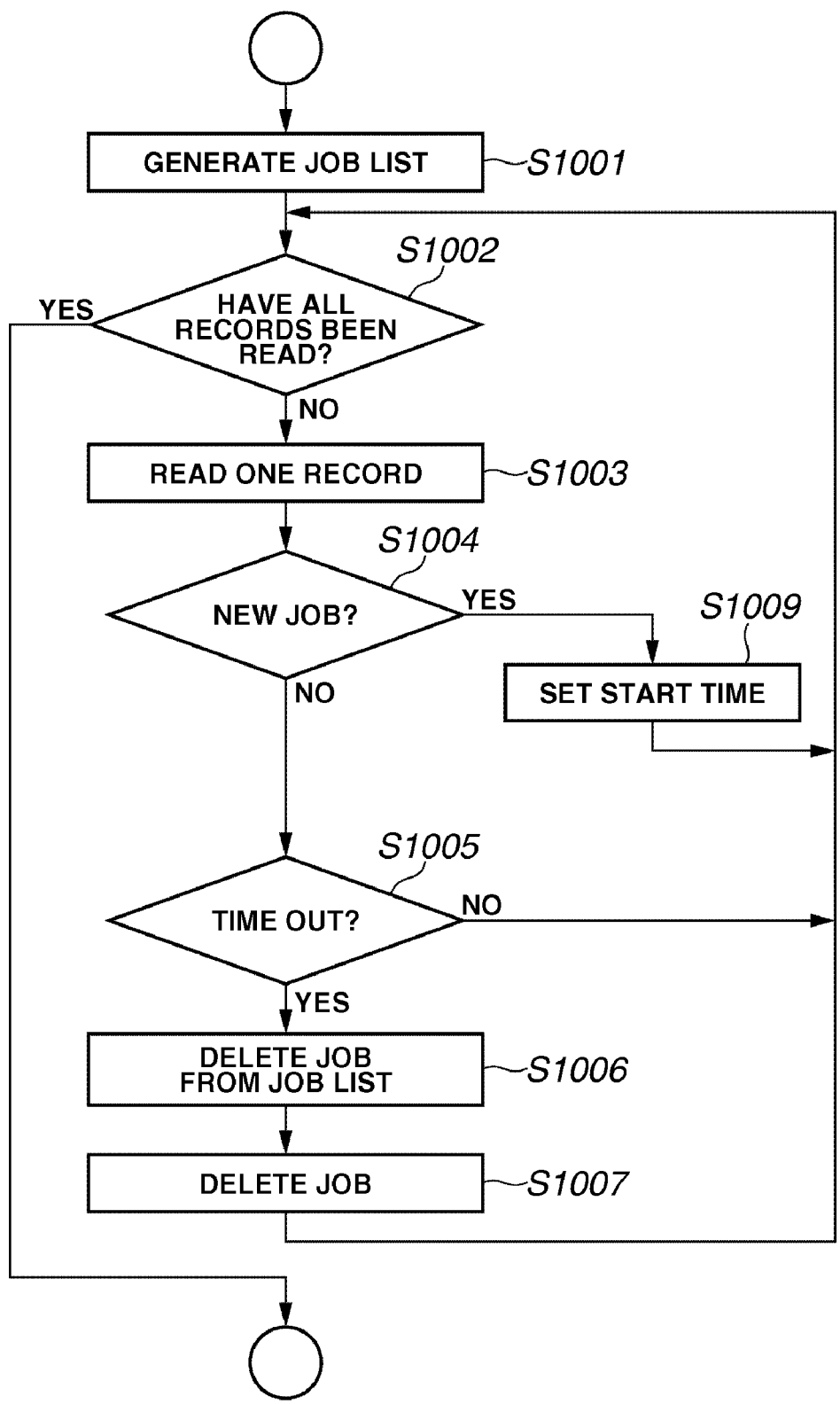
FIG. 10 illustrates an exemplary flow of a process performed in a spooler monitoring module according to a third exemplary embodiment of the present invention.

In the following description, only differences of the third exemplary embodiment from the first and second exemplary embodiments are described. An improvement of the "job list generation" processing in step 603 of the basic flow of processing in the spooler monitoring module 407 illustrated in FIG. 6 is described below with reference to FIG. 10.

In step 1001, the spooler monitoring module 407 adds a print job acquired in step 601 illustrated in FIG. 6 and attribute information relating to the acquired print job to the job list 408. The job list 408 includes attribute information relating to the job, e.g., a job ID and a document name corresponding to each print job. Further, the job list 408 also includes additional information, such as a billing code added by the print system to a print job and a "deletion timer start time" corresponding to each print job. When the spooler monitoring module 407 is activated, the job list 408 is stored in the storage medium, such as the RAM 202 and the HD 205. The attribute information relating to the job is acquired by the Win32 function GetJob( ) provided in Windows® produced by Microsoft Corporation or a method unique to the print system. An initial state of a field storing "deletion timer start time" is assumed blank.

Next, in step 1002, the CPU 200 checks the number of records in the job list 408 stored in the storage medium, such as the RAM 202 and the HD 205 in step 1001. If the number of the records is zero (0), the CPU 200 finishes "job list generation processing". Otherwise, the CPU 200 repeats a process consisting of steps 1003 through 1009 and read all of the records sequentially. If it is determined in step 1002 that all of the records have been read, the CPU 200 finishes the "job list generation processing".

Next, in step 1003, the CPU 200 reads one record from the job list 408 stored in the storage medium, such as the RAM 202 or the HD 205, in step 1001 and stores the read record in a work area, which is secured in the storage medium, such as the RAM 202 or the HD 205.

Next, in step 1004, the spooler monitoring module 407 checks data of one record stored in the work area in step 1003. Then, the spooler monitoring module 407 determines whether the job corresponding to the record is a new job. If the field storing the "deletion timer start time" is blank, the CPU 200 determines that the job is a new one.

If it is determined in step 1004 that the job is a new one, the CPU 200 sets the "deletion timer start time" in the associated record of the job list 408 stored in the storage medium, such as the RAM 202 and the HD 205, for the current time and stores the set "deletion timer start time" in step 1005.

If it is determined in step 1004 that the job is not a new one, the spooler monitoring module 407 checks data of one record stored in the work area in step 1003 and determines whether a timeout occurs. More particularly, the CPU 200 compares the "deletion timer start time" recorded in the one record stored in the work area with the current time. If a difference therebetween exceeds a predetermined timeout value, the CPU 200 determines that a timeout has occurred.

If it is determined in step 1005 that no timeout has occurred, the CPU 200 repeats a process consisting of steps 1002 to 1009.

If it is determined in step 1005 that a timeout has occurred, the CPU 200 deletes the currently checked record from the job list 408 stored in the storage unit, such as the RAM 202 and the HD 205 in step 1006. Then, the CPU 200 causes the storage unit to store the job list 408.

Next, in step 1007, the spooler monitoring module 407 deletes the job from the queue in the spooler 403. For example, the CPU 200 designates the job using the Win32 function SetJob( ) provided in Windows®. Then, the CPU 200 designates a parameter of the function as "JOB_CONTROL_DELETE" in order to delete processing of the job. Subsequently, the CPU 200 repeats a process consisting of steps 1002 to 1009.

As described above, according to the third exemplary embodiment, a print job whose additional information is not input will not be left unperformed in the queue in the spooler 403.

Fourth Exemplary Embodiment

According to a fourth exemplary embodiment of the present invention, an improvement of a printing control method is provided such that in a case where a user mistakenly adds additional information, such as a billing code, to a print job, the additional information can be changed even after the user finishes inputting a print instruction b.

Figure 11:
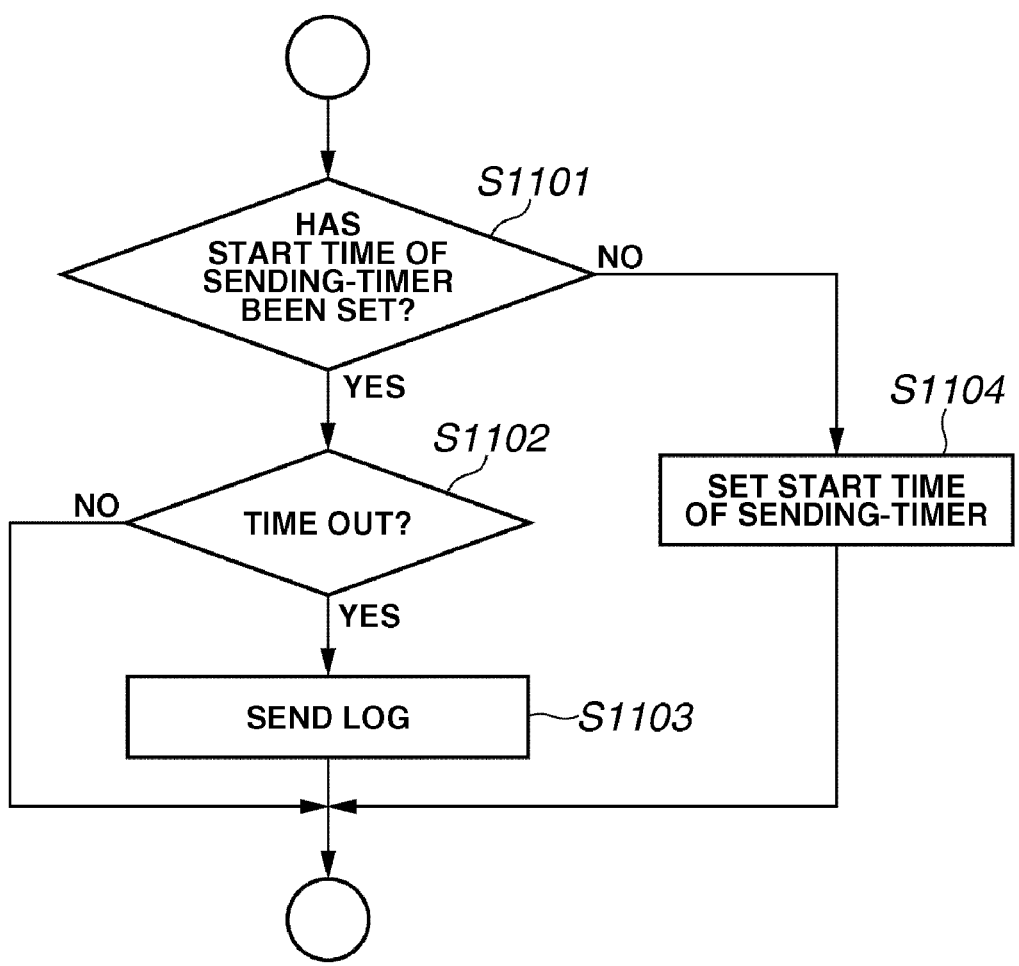
FIG. 11 illustrates an exemplary flow of a process performed in a spooler monitoring module according to a fourth exemplary embodiment of the present invention.

In the following description, only differences of the fourth exemplary embodiment from the first through third exemplary embodiments are described. An improvement of the "log sending" processing in step 608 of the basic flow of processing in the spooler monitoring module 407 illustrated in FIG. 6 is described below with reference to FIG. 11.

The job list 408 includes attribute information relating to the job, e.g., a job ID and a document name corresponding to each print job. Further, the job list 408 also includes additional information, such as a billing code added by the print system to a print job and a "sending-timer start time" corresponding to each print job. When the spooler monitoring module 407 is activated, the job list 408 is stored in the storage medium, such as the RAM 202 and the HD 205. The attribute information relating to the job is acquired by the Win32 function GetJob( ) provided in Windows® or a method unique to the print system. An initial state of a field storing "sending-timer start time" is assumed to be blank.

In step 1101, the spooler monitoring module 407 determines whether a sending-timer start time is set. More particularly, the CPU 200 fetches a record corresponding to a job which is determined in step 607 illustrated in FIG. 6 to be finished from the job list 408 stored in the storage medium, such as the RAM 202 and the HD 205. Then, the CPU 200 reads the "sending-timer start time" from the fetched record and stores the read sending-timer start time" in the work area. If it is determined that the field storing the "sending-timer start time" in the work area is not blank, the CPU 200 determines that the sending-timer start time is set.

If it is determined in step 1101 that the sending-timer start time is set, the spooler monitoring module 407 determines whether a timeout occurs in step 1102. That is, the "sending-timer start time" stored in the work area in step 1101 is compared with a current time. If a difference therebetween exceeds a predetermined threshold for a timeout, the spooler monitoring module 407 determines that a timeout occurs.

If it is determined in step 1102 that a timeout has occurred, the spooler monitoring module 407 notifies a log collection server 1101 of a log in step 1103. More particularly, the CPU 200 fetches a record of an ended job from the job list 408 stored in the storage medium, such as the RAM 202 or the HD 205. Then, the CPU 200 generates a log illustrated in FIGS. 5A and 5B and passes the log to the server notification module 410. The CPU 200 deletes the associated record from the job list 408 and stores the job list 408 in the storage medium, such as the RAM 202 or the HD 205. The server notification module 410 notifies the log collection server 101 of the log via the network.

If it is determined in step 1102 that no timeout has occurred, the spooler monitoring module 407 finishes the "log sending" processing.

If it is determined in step 1101 that a sending-timer start time is not set, the process proceeds to step 1104. The CPU 200 sets the "sending-timer start time" recorded in the associated record in the job list 408 for a current time. Then, the CPU 200 causes the storage unit to store the job list 408.

According to the fourth exemplary embodiment, additional information, such as a billing code, can be changed for a certain time, after a print instruction is issued (upon completion of a print job) by preliminarily setting timing to send a log.

Fifth Exemplary Embodiment

In a case where a large number of jobs are not spooled in a queue in the spooler 403, sometimes, a turn to process a job in the queue in the spooler 403 comes earlier than a user inputs additional information corresponding to the job. Thus, it can be determined that the additional information corresponding to the job is not input. In this case, according to the first exemplary embodiment, the job is paused. Consequently, the user needs to cancel the pause status of the job. According to the third exemplary embodiment, the job may automatically be deleted.

Figure 12:
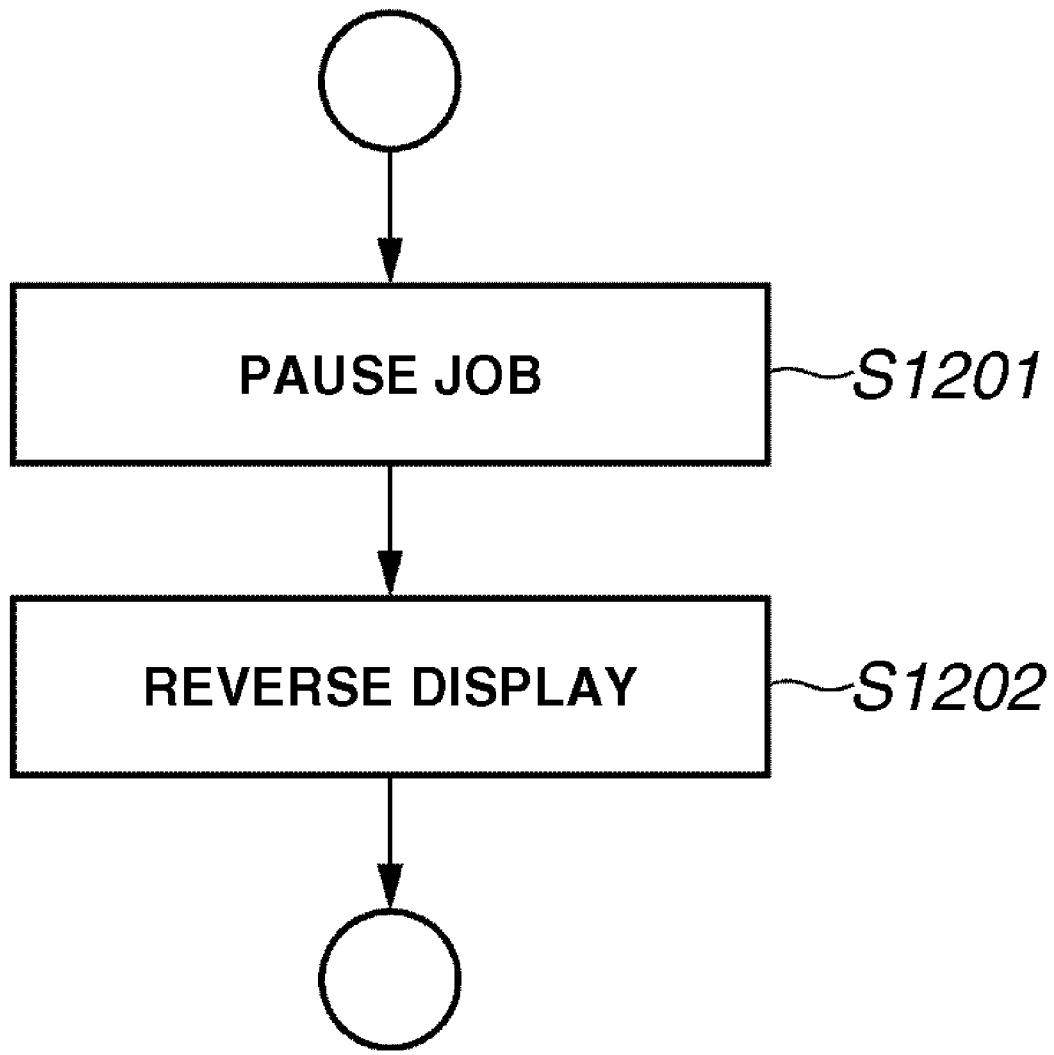
FIG. 12 illustrates an exemplary flow of a process performed in a UI processing unit according to a fifth embodiment of the present invention.
Figure 13:
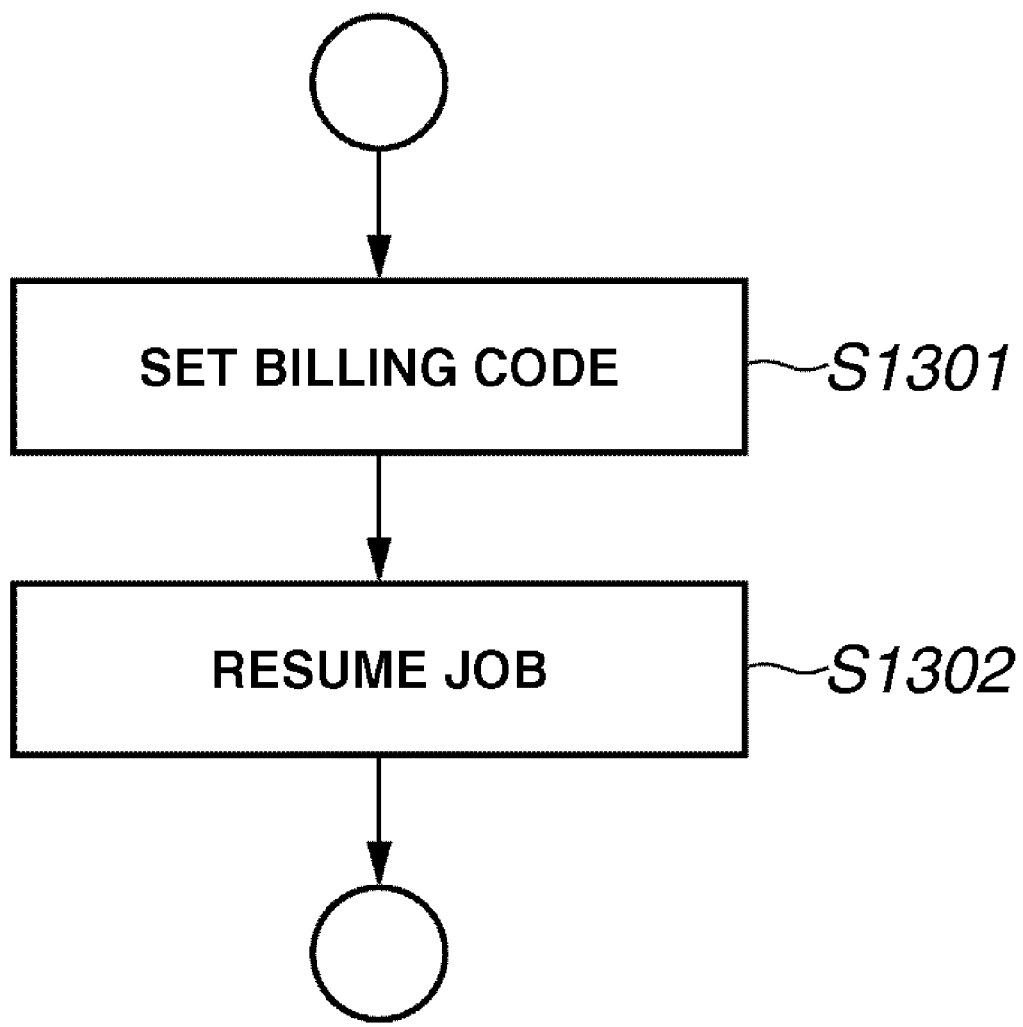
FIG. 13 illustrates an exemplary flow of a process performed in the UI processing unit according to the fifth embodiment of the present invention.

In the following description of a fifth exemplary embodiment, only differences of the fifth exemplary embodiment from the first through fourth exemplary embodiments are described below. More specifically, improvements of the "reverse displaying" processing in step 803 and the "billing-code setting" processing in step 805 of the flow showing the basic operation in the UI processing unit 409 illustrated in FIG. 8 are described below with reference to FIGS. 12 and 13.

In the "reverse display" processing, the UI processing unit 409 pauses a job in step 1201. For example, the UI processing unit 409 uses the Win32 SetJob( ) provided in Windows® and designates a parameter of the function as "JOB_CONTROL_PAUSE" so as to pause processing of the job corresponding to the ID acquired in step 802 illustrated in FIG. 8.

Next, in step 1202, the UI processing unit 409 reversely displays the record according to a preliminarily provided method. Then, the UI processing unit 409 finishes the "reverse-displaying" processing.

In the "billing-code setting" processing, the UI processing unit 409 sets a billing code in each job in the job list 408 in step 1301. The CPU 200 searches the display section 307 for a record reversely displayed in the job list. Then, the CPU 200 acquires a job ID from the found record. Subsequently, the CPU 200 sets values of first, second, and third billing codes illustrated in FIG. 3 in the billing code fields of an associated record in the job list 408 stored in the storage unit, such as the RAM 202 and the HD 205.

Next, the UI processing unit 409 resumes the job in step 1302. The UI processing unit 409 uses the Win32 SetJob( ) provided in Windows®, and designates a parameter of the function as "JOB_CONTROL_RESUME" so as to resume processing of the job. In a case where the job is paused, the pause is canceled. In a case where a part of job data has been sent, the apparatus resumes the job by starting to send the rest of the job data. In a case where the job is not paused, the status of the job does not change.

The fifth exemplary embodiment can prevent a selected job from being deleted while additional information, such as a billing code, corresponding to the selected job is input. Additionally, the job whose additional information is input is automatically resumed, and the fifth exemplary embodiment can save users' efforts for resuming the job.

Sixth Exemplary Embodiment

In a case where printing is performed without using the port monitor 404, e.g., printing is performed using a printer server based on NetWare® developed by Novell Incorporation, a client computer cannot confirm that additional information is set in the job sent from the port monitor 404. Accordingly, the client computer can not permit only the jobs, in which additional information has surely been set, to perform printing. Thus, an improvement of a printing control apparatus is provided, in which an image processing apparatus, such as a printer and a copier, confirms whether additional information is set in the job.

A sixth exemplary embodiment is described with reference to FIGS. 3, 5A, 5B, 14, 15, and 16. The above-described other exemplary embodiments can be applied to the sixth exemplary embodiment. In the following description, only differences of the sixth exemplary embodiment from the first through fifth exemplary embodiments are described.

Figure 14:
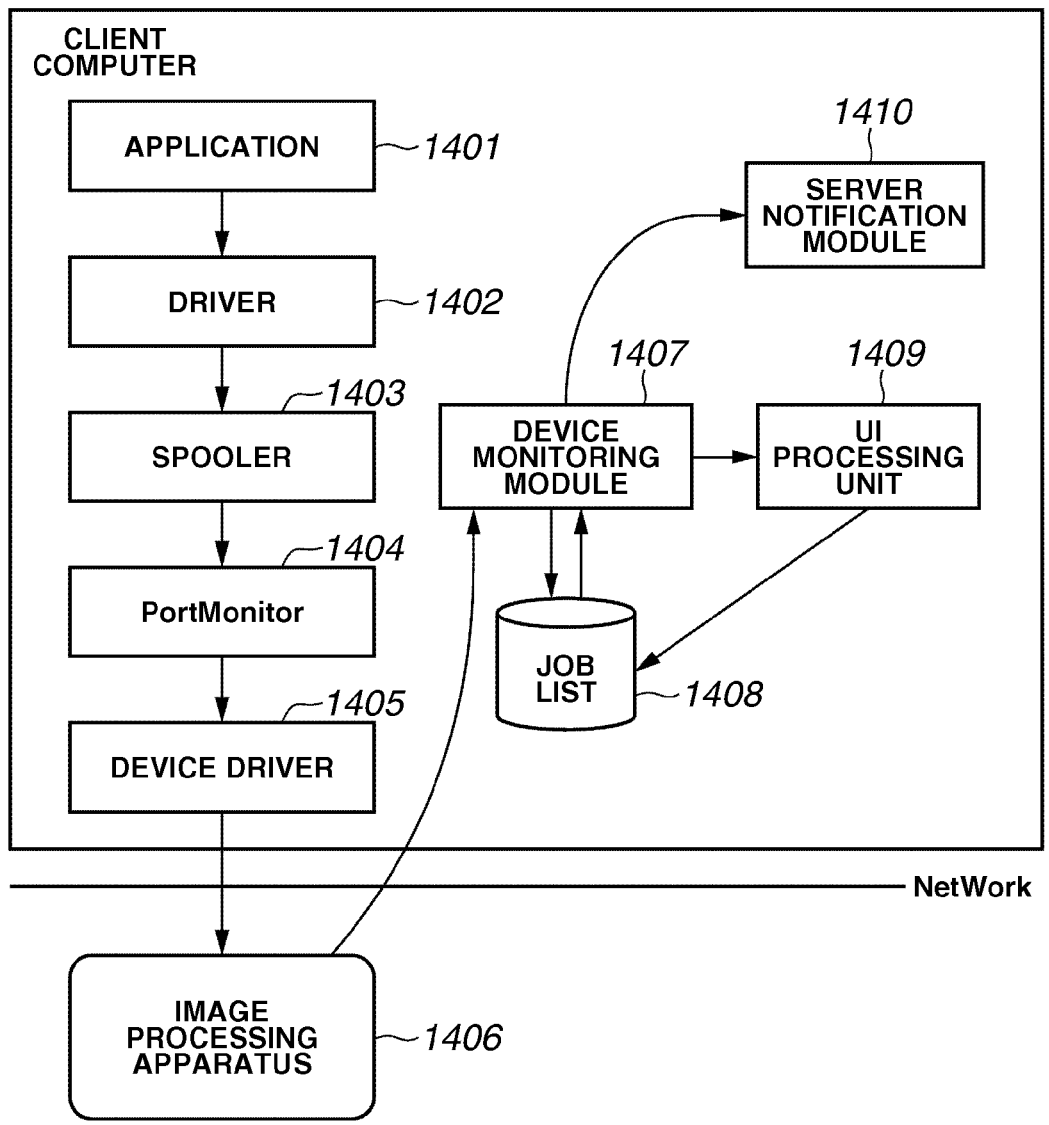
FIG. 14 is a block diagram illustrating an exemplary relation among modules and devices operating in a client computer according to a sixth exemplary embodiment of the present invention.

FIG. 14 illustrates an example of modules operating on a client computer constituting a print system, a relation between the modules and an image processing apparatus, and a flow of a job according to the sixth exemplary embodiment of the present invention. The client computer, e.g., a widely-used personal computer (corresponding to the information processing apparatus) uses Windows® as an OS. Further, the client computer activates an application program (print application program) 1401, such as Word®, which has a print processing function. A user generates a document using the instruction devices, such as the keyboard 206 and the pointing device 209. Then, the user instructs printing of the document using a print instruction unit provided for the application programs. The application program 1401 passes print data to a printer driver 1402 and generates a print job. The printer driver 1402 passes the generated print job to a spooler 1403. The spooler 1403 spools the print jobs passed from a plurality of drivers and schedules the jobs corresponding to each of the printers specified by the user. Then, the spooler 1403 passes the print job to a port monitor 1404 corresponding to a port connected to the printer. The port monitor 1404 accordingly calls a device driver 1405 corresponding to the port (e.g., a universal serial bus (USB) or a network port) and passes the job to the device driver 1405. The device driver 1405 transfers the passed print job to an image processing apparatus 1406 via the connection unit 210 and a network.

The image processing apparatus 1406 stores a print job passed from the client computer and pauses the print job until the client computer instructs the image processing apparatus 1406 to resume the print job.

A device monitoring module 1407 automatically starts operating when the client computer is booted. The device monitoring module 1407 monitors the status of the job in the image processing apparatus 1406 using a device monitoring function preliminarily provided in the module. When jobs are accumulated in the print queue, information representing jobs is stored in the job list 1408, together with annex information representing a status, a size, an owner, a document name, a date and a time. Simultaneously, a UI processing unit 1409 displays an information input UI in the display unit 207, such as a CRT. The UI processing unit 1409 displays an information input dialog box, which is illustrated in FIG. 3, in the display unit 207 of the client computer. When input information is received from the user, the UI processing unit 1409 reflects the input information in the job list 1408. Additionally, the device monitoring module 1407 instructs the image processing apparatus 1406 to resume the job, and passes a log of the job which has finished printing, to a server notification module 1410. Thus, the log collection server 101 is notified of the log.

Figure 15:
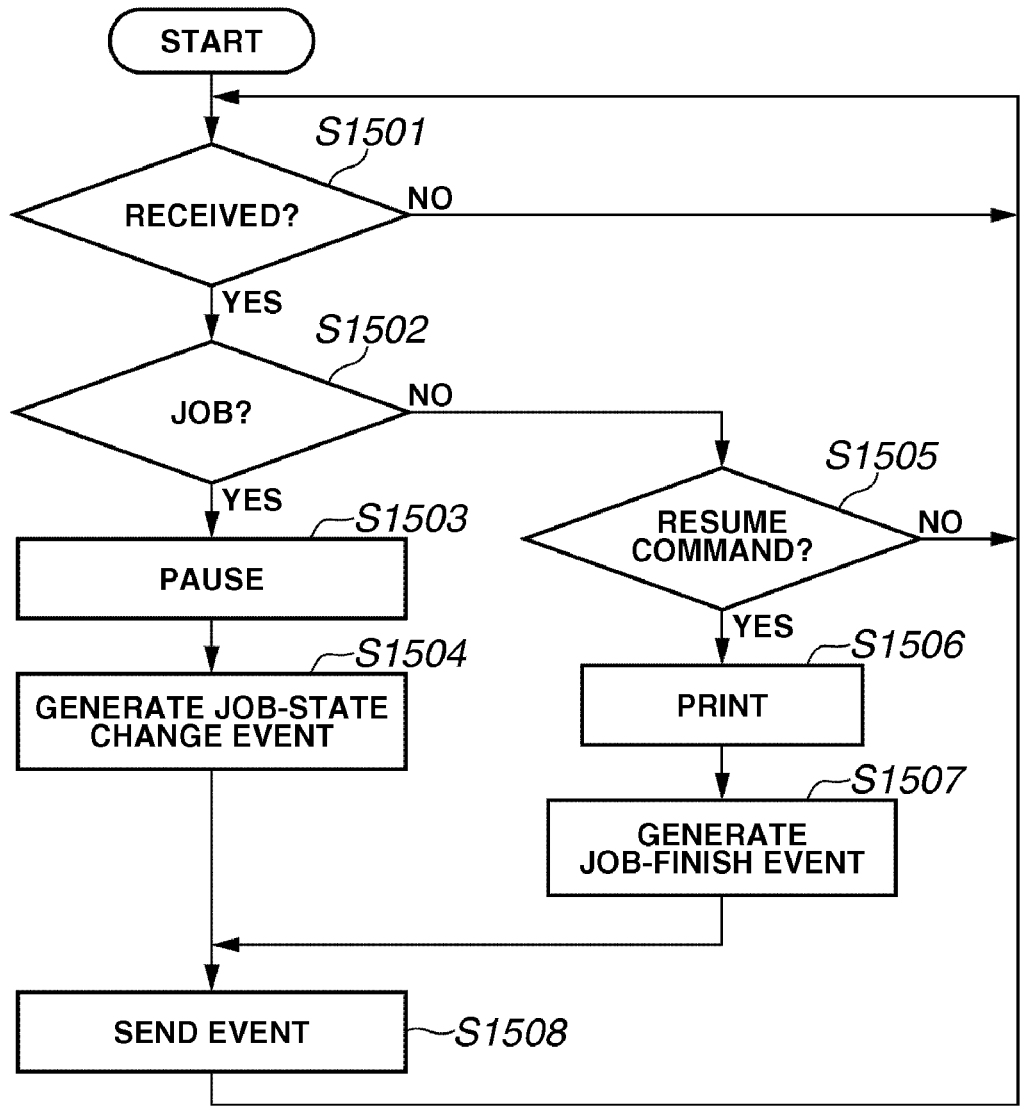
FIG. 15 illustrates an exemplary basic flow of a process performed in an image processing apparatus according to the sixth exemplary embodiment of the present invention.

A basic flow of the image processing apparatus 1406 is described below with reference to FIG. 15. The image processing apparatus 1406 has functions of receiving a job operation command from the client computer and of notifying, when the status of the job changes, the client computer of the change of the job. An event of notifying the change of the status includes a job ID which uniquely determines a job in the image processing apparatus 1406 and information representing a job status. Additionally, print data corresponding to each job can be accumulated in a print queue secured in the storage medium, such as a PRAM 222. Thus, a given print job can be fetched to pause, resume, delete, and print.

In step 1501, the image processing apparatus 1406 determines whether data is received. When receiving data from the network through the bidirectional interface 211 via the connection unit 226, the image processing apparatus 1406 store the data in the work area assured in the storage unit, such as the PRAM 222. The image processing apparatus 1406 repeats the processing until receiving data.

If it is determined in step 1501 that the data is received, the image processing apparatus 1406 determines in step 1502 whether the received data represents a job. More particularly, the image processing apparatus 1406 checks received data stored in the work area secured in the storage unit, such as the PRAM 222, using the PCPU 220. If the received data has a predetermined job format, the image processing apparatus 1406 determines that the received data represents a job.

If it is determined in step 1502 that the received data represents a job, the image processing apparatus 1406 pauses a job in step 1503 according to a predetermined procedure and causes the storage unit, such as the PRAM 222, to store the job.

Next, in step 1504, the image processing apparatus 1406 generates a status change event of the job having a job status of "pause", using the PCPU 220. Then, data representing the generated status change event is stored in the work area secured in the storage unit, such as the PRAM 222. Then, the process proceeds to step 1508.

If it is determined in step 1502 that the received data does not represent a job, in step 1505 the image processing apparatus 1406 determines whether the received data represents a resume command. More particularly, the image processing apparatus 1406 checks the received data stored in the work area secured in the storage unit, such as the PRAM 222, using the PCPU 220. If the received data has a predetermined command format and if a type of a command is a resume of a job, the image processing apparatus 1406 determines that the received data represents a "resume command".

Next, in step 1506, the image processing apparatus 1406 fetches a job corresponding to a job ID included in the command acquired in step 1505 from a queue secured in the storage unit, such as the PRAM 222, and performs printing. For example, the image processing apparatus 1406 rasterizes the print job into image data (bit map data), on which predetermined image processing is performed, and causes the printer engine to perform printout.

Next, in step 1507, the image processing apparatus 1406 generates a job-finish event corresponding to the job in which printing has been performed in step 1506. That is, the image processing apparatus 1406 uses the PCPU 220 and stores status change event data that has a job ID of the job, in which printing has been performed in step 1506, as job ID information and that has information representing a "print finish" status as job status information in the work area secured in the storage unit, such as the PRAM 222.

In step 1508, the image processing apparatus 1406 uses the PCPU 220 so as to fetch event data stored in the work area secured in steps 1504 and 1507 in the storage unit, such as the PRAM 222. Then, the image processing apparatus 1406 sends the fetched data to the client computer via the connection unit 226 and the bidirectional interface 211.

Figure 16:
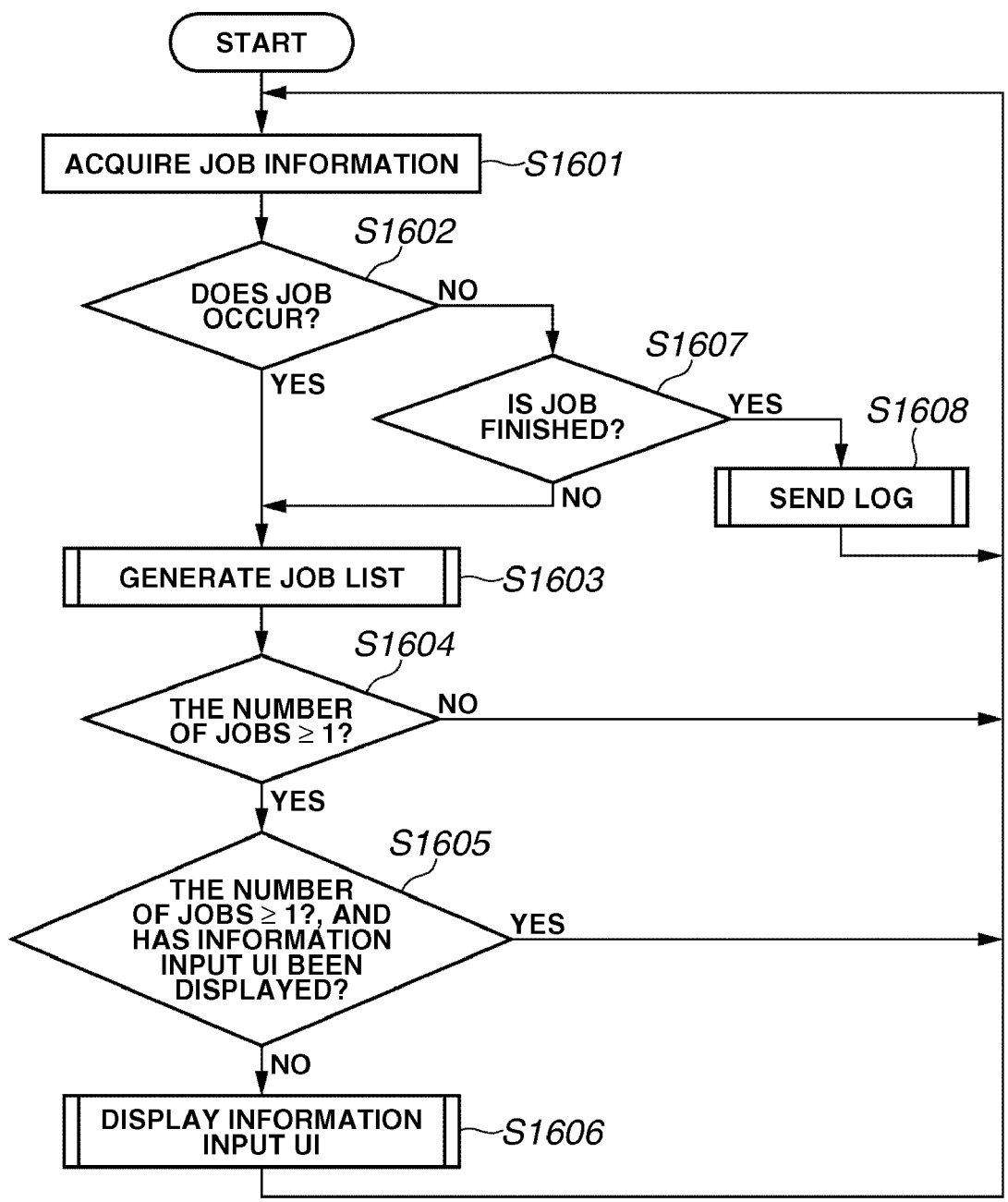
FIG. 16 illustrates an exemplary basic flow of a process performed by a device monitoring module according to the sixth exemplary embodiment of the present invention.

A basic flow of the device monitoring module 1407 is described below with reference to FIG. 16.

In step 1601, the device monitoring module 1407 acquires a job listing. The PCPU 200 receives a job status change event notified from the image processing apparatus 1406 through the bidirectional interface 211 via the connection unit 210. The device monitoring module 1407 stores the received event in the work area secured in the storage unit, such as the RAM 202 or the HD 205.

Next, in step 1602, the device monitoring module 1407 determines whether a job occurs. More particularly, the PCPU 200 checks the event stored in the work area having been secured in step 1601 in the storage unit, such as the RAM 202 or the HD 205. If the status represented by the event is a "pause" status, the device monitoring module 1407 determines that a new job occurs.

If it is determined in step 1602 that no new job occurs, the device monitoring module 1407 determines in step 1607 whether the job is finished. More particularly, the CPU 200 checks the event stored in the work area that has been secured in the storage medium in step 1601. If it is determined that the status is a "print finish" status, the CPU 200 determines that printing has been finished in the job.

If it is determined in step 1607 that the job is finished, the device monitoring module 1407 notifies the log collection server 101 of a log in step 1608. More particularly, the CPU 200 fetches a record of the finished job from the job list 1408 stored in the storage medium, such as the RAM 202 or the HD 205. Then, the CPU 200 generates the log illustrated in FIG. 5A and passes the log to the server notification module 1410. The CPU 200 deletes the associated record from the job list 1408. Then, the CPU 200 stores the job list 1408 in the storage medium, such as the RAM 202 or the HD 205. The server notification module 1410 notifies the log collection server 101 of the log through the network.

If it is determined in step 1602 that a new job has occurred, and if it is determined in step 1607 that the job is not finished, the process proceeds to step 1603. In step 1603, the device monitoring module 1407 adds a job ID and a job status included in the event acquired in step 1601 and annex information, such as an owner and a document name, to the job list 1408. The job list 1408 includes attribute information representing a job ID, a document name and the like corresponding to each job, and includes also additional information representing a billing code and the like, which corresponds to each job and is added by the print system. When the device monitoring module 1407 is activated, the job list 1408 is stored in a predetermined area of the storage medium, such as the RAM 202 or the HD 202.

Next, in step 1604, the device monitoring module 1407 determines whether the job list 1408 generated in step 1603 includes one or more jobs. More particularly, the CPU 200 studies the job list 1408 stored in the storage medium, such as the RAM 202 or the HD 205, and calculates the number of the records of jobs. If the device monitoring module 1407 determines that the job list 1408 does not include one or more jobs, the process proceeds to step 1601.

If it is determined in step 1604 that the job list 1408 includes one or more jobs, the device monitoring module 1407 determines in step 1605 whether an information input UI has been displayed by the UI processing unit 1409. For example, the device monitoring module 1407 calls a Win32 function FindWindow( ) provided in Windows® produced by Microsoft Corporation. If a window based on the UI processing unit 1409 is present, the device monitoring module 1407 determines that the information input UI has been displayed. If the information input UI has been displayed, a process consisting of steps 1601 through 1608 is repeated.

If it is determined in step 1605 that no information input UI is displayed, in step 1606 the device monitoring module 1407 causes the UI processing unit 1409 according to a predetermined procedure to display and control an information input UI.

A method adapted to cause an image processing apparatus to notify the client computer of an event (trap an event) at an optional timing has been described as an example of a method for notifying the client computer of a job status in the image processing apparatus. However, even in a case where the method is adapted so that the client computer designates a timing at which the client computer acquires job information, the present invention can be applied to such a method.

According to the sixth exemplary embodiment of the present invention, even in a case where additional information cannot be input by the client computer before a job is sent, additional information can be input before printing is performed by the image processing apparatus. Additional information can be input at the image processing apparatus.

Other Exemplary Embodiments

The present invention may be applied, for example, to either a system including a plurality of devices or an apparatus constituted by a single device. For example, the present invention can be applied to, e.g., a printer, a facsimile apparatus, a PC, and a computer system including a server and a client computer.

The processes according to the above-described exemplary embodiments can be performed, for example, in a print apparatus. In this case, a user can set a billing code or the like from an input panel or the like, which is provided in the print apparatus. In this case, print data is output to an image engine serving as a destination print apparatus. Additionally, a queue (storage area) in the print apparatus may be monitored by the monitoring module as a monitoring item. States of the print data can be displayed.

The present invention can be achieved, for example, by supplying a software program, which implements the functions of the above-described exemplary embodiments, directly or remotely to a system or apparatus, and by reading and executing the supplied program code with a computer included in the system or apparatus.

In such instance, the present invention may be implemented, for example, by the program code itself installed in the computer so as to implement the functions and processing according to the present invention. For example, the present invention includes a computer program for implementing the functions and processing according to the present invention.

In this case, as long as the system or apparatus has functions of the program, the program can have any of a wide variety of forms, e.g., an object code, a program executed by an interpreter, and script data supplied to an OS or the like.

Storage media for supplying the program are, e.g., a floppy disk, a hard disk, an optical disk, an MO, a CD-ROM, a CD-R, a CD-RW, a magnetic tape, a non-volatile type memory card, a ROM, and a DVD (digital versatile disk read-only memory (DVD-ROM) and a digital versatile disk recordable (DVD-R)).

The program can be downloaded from a homepage on the Internet using a browser of a client information processing apparatus. A computer program itself according to the present invention or an automatically-installable compressed file including an automatically installing function can be downloaded to a recording medium such as a hard disk. Further, the program according to the present invention can be supplied by dividing the program code constituting the program according to the present invention into a plurality of files and downloading the files from different homepages. For example, a World Wide Web (WWW) server, which allows a plurality of users to download the program files that implement the functions and processing according to the present invention by a computer, can embody the present invention.

The program according to the present invention can be encrypted and stored in a storage medium, such as a CD-ROM, and the storage medium can be distributed to users. In this case, the program can be installed in computers by permitting only users, who meet predetermined conditions, to download decryption key information from a homepage via the Internet, to decrypt the encrypted program using the key information, and to execute the program.

The functions of the above-described exemplary embodiments can be implemented by executing a read program by a computer. According to instructions from the computer, an OS or the like running on the computer can perform all or a part of the actual processing, thereby implementing one or more embodiment of the present invention.

Further, a program read from the storage medium can be written to a function expansion board inserted into the information processing apparatus or to a memory provided in a function expansion unit connected to the information processing apparatus, a CPU or the like provided in the function expansion board or the function expansion unit performs all or a part of the actual processing. Consequently, the functions of the above-described exemplary and other embodiments can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-172288 filed Jun. 29, 2007, which is hereby incorporated by reference herein in its entirety.

What is claimed is:

1. A printing control apparatus configured to store print jobs in a storage area in the order of being received from a print application and to send the stored print jobs to a print apparatus, comprising:

a control unit configured to control an order of sending the print jobs stored in the storage area to the print apparatus according to a setting status of a billing code for each of the print jobs, wherein the billing code consists of a plurality of independent subcodes;

a display unit configured to display a list of the print jobs received from the print application, wherein, before a print job is stored in the storage area, a billing code can be individually set in the print job and the setting status of the billing code for each of the print jobs is identifiable in the list of the print jobs; and a setting unit configured to select a plurality of print jobs from the list according to input by a user and to set a billing code simultaneously in the plurality of selected print jobs, wherein the print jobs received from the print application include a first print job in which a billing code is not set and a second print job in which a billing code including a designation of at least one of the subcodes is set, and wherein the control unit controls the order of sending the print jobs so that said second print job received subsequent to said first print job is sent to the print apparatus while said first print job remains at the print control apparatus.

2. The printing control apparatus according to claim 1, further comprising a transmitting unit configured to send the print apparatus a log of information regarding the print jobs received from the print application, the information including at least one billing code.

3. The printing control apparatus according to claim 1, further comprising a priority setting unit configured to set a priority of processing to be high for print jobs in which the billing code is set by the setting unit, thereby supporting preferential processing of print jobs in which the billing code is set by the setting unit.

4. The printing control apparatus according to claim 1, further comprising a deletion unit configured to delete a print job in a case where the print job does not have a billing code that is set and has been in the storage area for a period of time that exceeds a threshold value.

5. A method for storing print jobs in a storage area in the order of being received at the storage area from a print application and for sending the stored print jobs to a print apparatus, comprising:

sending the print jobs stored in the storage area to the print apparatus, according to a setting status of a billing code for each of the print jobs, wherein the billing code consists of a plurality of independent subcodes;

displaying a list of the received print jobs, wherein, before a print job is stored in the storage area, a billing code can be individually set in the print job and the setting status of the billing code for each of the print jobs is identifiable in the list of the print jobs; and selecting a plurality of print jobs from the list according to input by a user and setting a billing code simultaneously in the plurality of selected print jobs, wherein the print jobs received from the print application include a first print job in which a billing code is not set and a second print job in which a billing code including a designation of at least one of the subcodes is set, and wherein the sending of the print jobs stored in the storage area to the print apparatus includes controlling the order of sending the print jobs so that said second print job received subsequent to said first print job is sent to the print apparatus while said first print job remains at the storage area.

6. The method according to claim 5, further comprising sending a log of information regarding the print jobs received, the log including at least a billing code.

7. The method according to claim 5, further comprising:
setting a priority of processing of the print jobs, in which the billing code is set, to be high so as to preferentially process the print data in which the billing code is set.

8. The method according to claim 5, further comprising:
deleting a print job with no billing code that is set, in a case where a time, in which the print job with not billing code that is set, is present in the storage area, exceeds a threshold value.

9. A non-transitory computer-readable storage medium storing a program for causing a computer to execute the method according to claim 5.

* * * * *